(12) United States Patent
Puma et al.

(10) Patent No.: US 8,315,575 B2
(45) Date of Patent: Nov. 20, 2012

(54) INTEGRATED CIRCUIT FOR MOBILE RADIO TRANSCEIVERS

(75) Inventors: Giuseppe Li Puma, Bochum (DE); Klaus Getta, Bochum (DE)

(73) Assignee: Intel Mobile Communications GmbH, Neubiberg (DE)

( * ) Notice: Subject to any disclaimer, the term of this patent is extended or adjusted under 35 U.S.C. 154(b) by 980 days.

(21) Appl. No.: 12/208,147

(22) Filed: Sep. 10, 2008

(65) Prior Publication Data

US 2009/0075603 A1   Mar. 19, 2009

(30) Foreign Application Priority Data

Sep. 10, 2007   (DE) .......................... 10 2007 042 979

(51) Int. Cl.
*H04B 1/40* (2006.01)

(52) U.S. Cl. ...................... 455/76; 455/180.2; 455/180.3

(58) Field of Classification Search ................... 455/42, 455/76, 180.2, 180.3, 188.1, 188.2, 205, 455/208, 260
See application file for complete search history.

(56) References Cited

U.S. PATENT DOCUMENTS

| | | | | |
|---|---|---|---|---|
| 6,032,028 A | * | 2/2000 | Dickey et al. | 455/110 |
| 6,151,354 A | * | 11/2000 | Abbey | 375/211 |
| 6,188,740 B1 | * | 2/2001 | Tomaru | 375/376 |
| 6,446,118 B1 | * | 9/2002 | Gottlieb | 709/217 |
| 6,756,927 B2 | * | 6/2004 | Hammes et al. | 341/143 |
| 7,348,894 B2 | * | 3/2008 | Bailey et al. | 340/854.3 |
| 7,593,695 B2 | * | 9/2009 | Jensen | 455/76 |
| 2006/0223455 A1 | | 10/2006 | Kerth | |
| 2006/0246944 A1 | | 11/2006 | Srinivas | |
| 2007/0058608 A1 | * | 3/2007 | Lin | 370/352 |
| 2007/0100514 A1 | | 5/2007 | Park | |

FOREIGN PATENT DOCUMENTS

| | | |
|---|---|---|
| DE | 42 91 263 C2 | 6/1993 |
| DE | 101 05 057 A1 | 8/2002 |
| DE | 101 08 636 A1 | 9/2002 |
| EP | 0 801 465 A1 | 10/1997 |
| WO | WO 00/28666 A1 | 5/2000 |

* cited by examiner

*Primary Examiner* — Tuan H Nguyen
(74) *Attorney, Agent, or Firm* — Eschweiler & Associates, LLC

(57) ABSTRACT

The invention relates to an integrated circuit in a mobile radio transceiver. This circuit includes a radio-frequency assembly for producing a mobile radio signal and a modulator for converting transmission data into an analogue, modulated transmission signal which is broadcast in a frequency band outside the mobile radio frequency range.

30 Claims, 13 Drawing Sheets

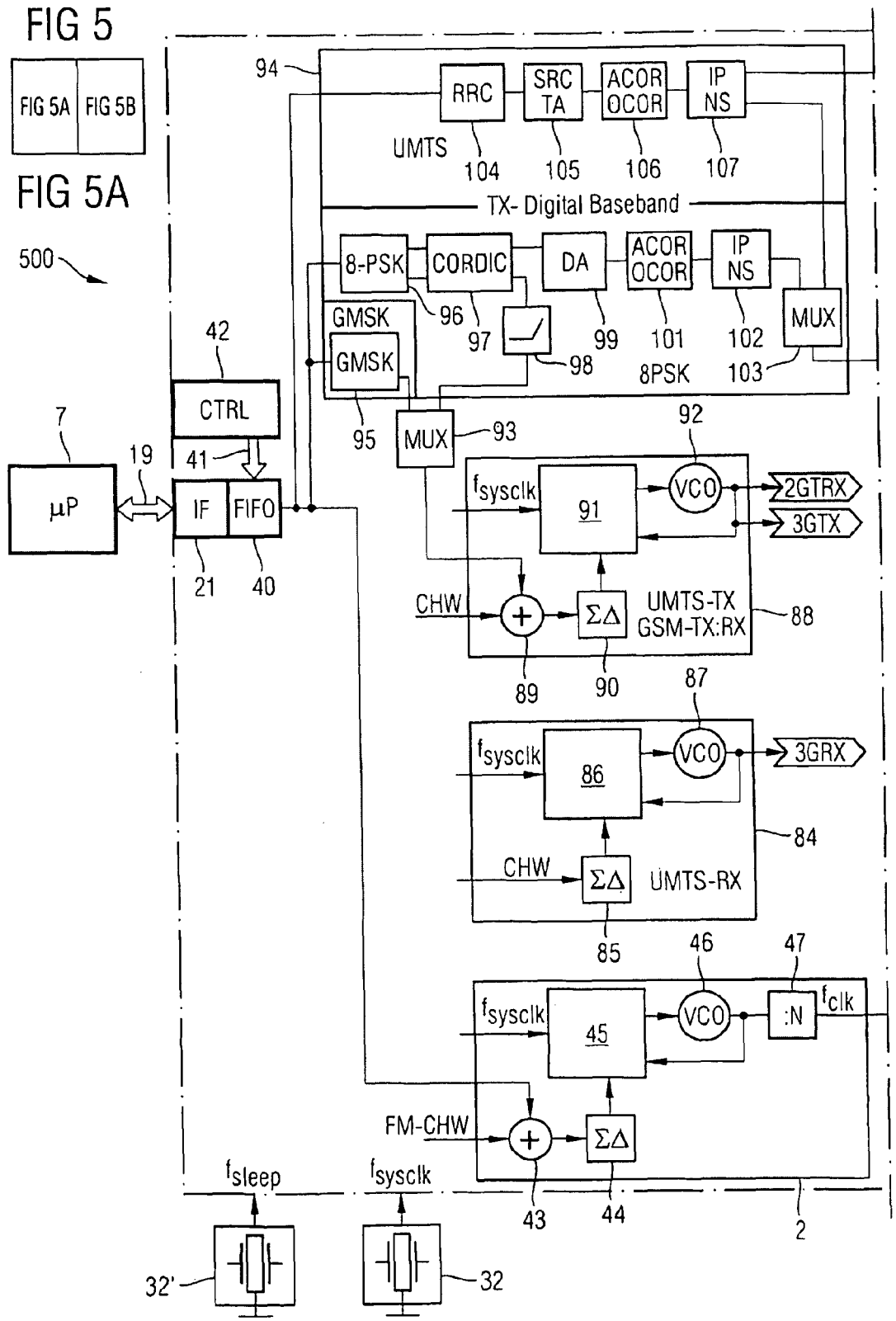

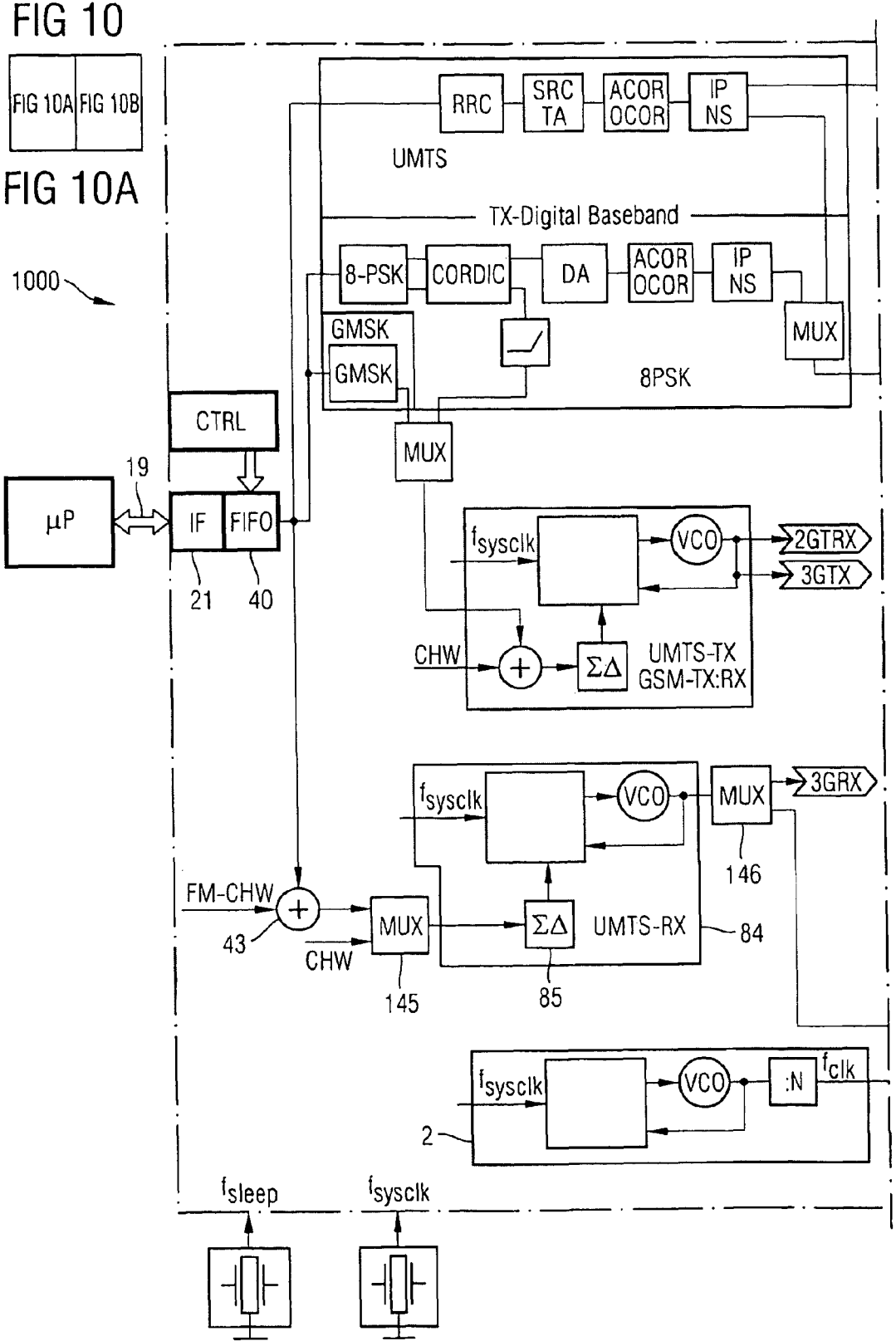

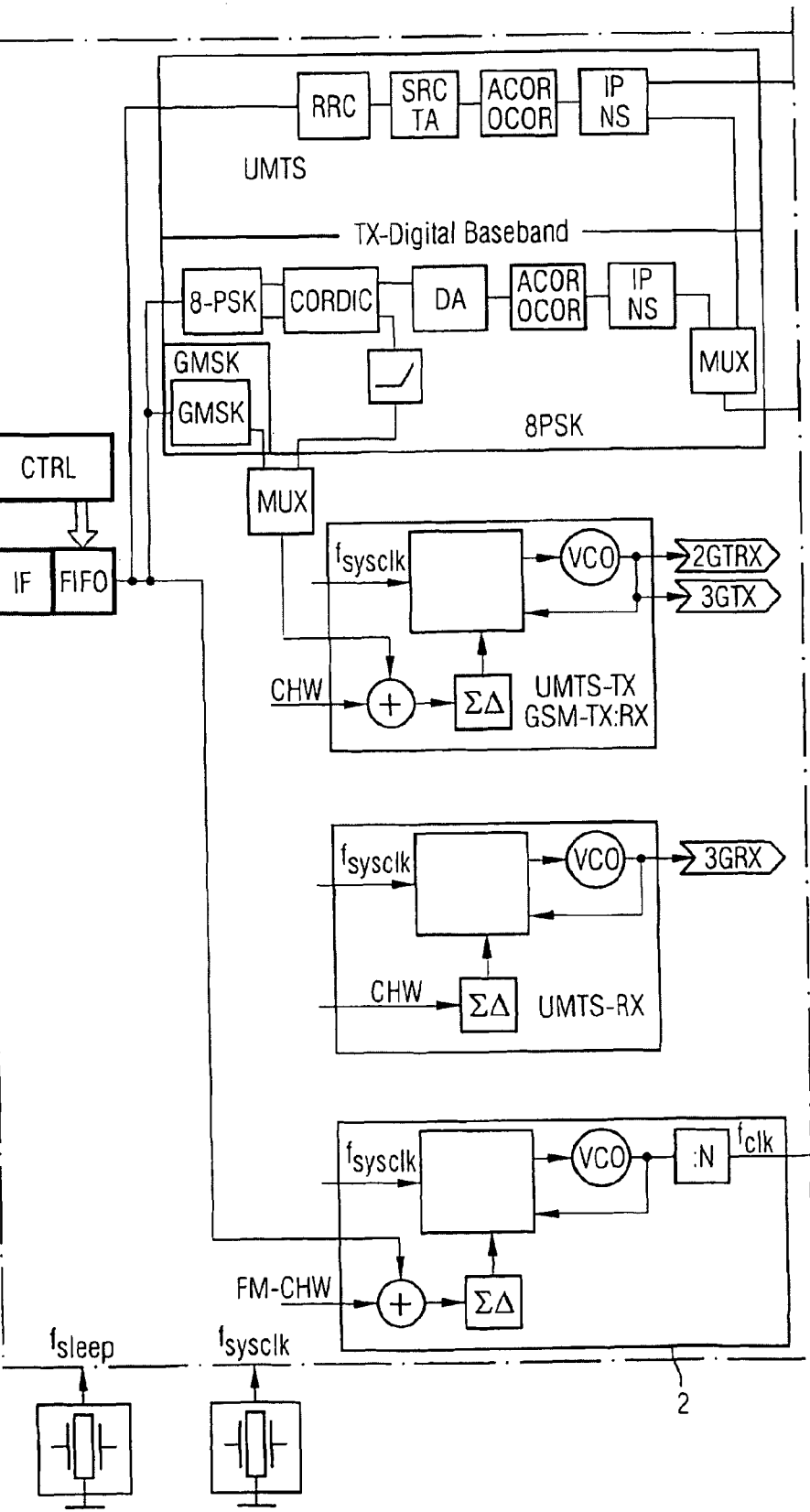

INTEGRATED CIRCUIT FOR MOBILE RADIO TRANSCEIVERS

FIELD

The invention relates to an integrated circuit for modulating transmission data for a mobile radio transceiver.

BACKGROUND

As they are developed further, mobile radio transceivers are providing an increasing number of functionalities. Thus, mobile radio transceivers may comprise assemblies that provide transmission data that are intended for other receivers that are not part of the mobile radio network. In this context, inexpensive and simplified implementation is desirable.

DETAILED DESCRIPTION

Embodiments are explained below with reference to the figures, in which identical reference signs denote the same or similar components. To assist clarity, the text below presents numerous specific details in order to provide a better understanding of one or more aspects of the embodiments. For a person skilled in the art, however, it goes without saying that one or more embodiments can also be implemented with a smaller number of the specific details. Accordingly, the description which follows should not be understood in a restrictive sense. Should a particular feature be disclosed explicitly only with respect to one specific embodiment, such a feature can be combined with one or more features of other embodiments so long as this is technically possible and makes sense for a particular embodiment.

According to one aspect, an integrated circuit in a mobile radio transceiver comprises a radio-frequency assembly for broadcasting a mobile radio signal and a modulator for converting transmission data into an analogue, modulated transmission signal which is broadcast in a frequency band outside the mobile radio frequency range.

Figure 1:
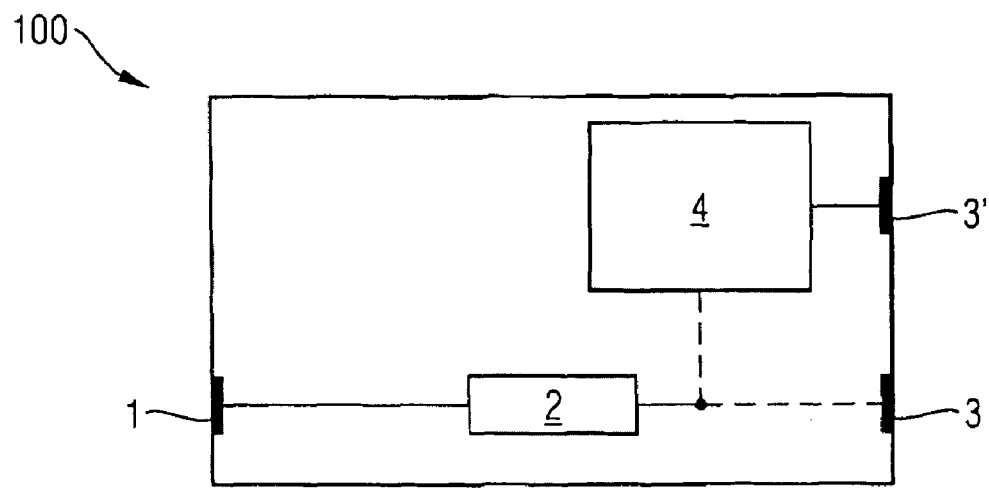
FIG. 1 shows a schematic illustration of an integrated circuit 100 as an exemplary embodiment.

FIG. 1 shows a schematic illustration of an integrated circuit 100 as an exemplary embodiment, as it may be provided in a mobile radio transceiver. The integrated circuit 100 includes a radio-frequency assembly 4 which is responsible for producing radio-frequency mobile radio signals which are to be broadcast and for processing radio-frequency mobile radio signals which have been received. To this end, the radio-frequency assembly 4 is coupled to an output 3' of the integrated circuit, which is usually connected to an antenna (not shown) of the mobile radio transceiver. The received or broadcast mobile radio signals are in one or more particular frequency ranges, which are typically prescribed by the mobile radio standard(s) supported by the radio-frequency assemblies.

The integrated circuit 100 also includes a modulator 2 which is coupled to an input 1 of the integrated circuit. The modulator 2 is either connected to an output 3 of the integrated circuit 100 or is coupled to the radio-frequency assembly 4, or both. These options are illustrated in FIG. 1 by the two dashed connections at the output of the modulator 2. The integrated circuit 100 is supplied with transmission data via the first input 1, said transmission data not being intended to be broadcast as mobile radio signals. The modulator 2 converts these transmission data into an analogue modulated transmission signal and forwards this signal to the output 3 or to the radio-frequency assembly 4. The output 3 or the output 3' outputs the analogue modulated transmission signal from the integrated circuit 100. This signal, which is not a mobile radio signal, i.e. is not intended for a mobile radio receiver (e.g. a base station), is broadcast in a frequency range which is different from the frequency range of the broadcast or received mobile radio signals.

The block diagram of FIG. 1 shows the modulator 2 and the radio-frequency assembly 4 by means of two separate blocks. The modulator 2 and the high-frequency assembly 4 do not have to be in the form of separate units, however. By way of example, the modulator 2 may be a component of the radio-frequency assembly 4 which is active for mobile radio transmission or reception activity and then performs a different function than when converting transmission data which are not intended to be transmitted as mobile radio signals. In other embodiments, the modulator 2 may include exclusively components which are not part of the radio-frequency assembly 4. In each case, the modulator 2 is formed in the same integrated circuit 100 (i.e. on the same substrate) as the radio-frequency assembly 4, however.

The digital transmission signal processed by the modulator 2, which signal is not intended for a mobile radio receiver, may be an audio signal, for example, which is sent to a radio receiver using a broadcast radio band. In this case, the mobile radio transmitter can be used to transmit audio data to a broadcast radio in the vicinity, and said audio data can be received by the latter and presented by means of loudspeakers.

Alternatively, the digital transmission signal processed by the modulator 2 and not intended for a mobile radio receiver may have other signal contents. By way of example, these may be data for what is known as a "remote keyless entry system", which is used to transmit access information, for example, for opening car doors or doors to other secure areas. In addition, it is also conceivable for the signal which is to be transmitted to be image or video data which are sent to appropriate display appliances (e.g. a television) and are presented there.

The detailed embodiments described below with reference to the figures are explained by way of example using the example of audio signals. However, the embodiments also apply to the transmission of signal data with other content.

Figure 2:
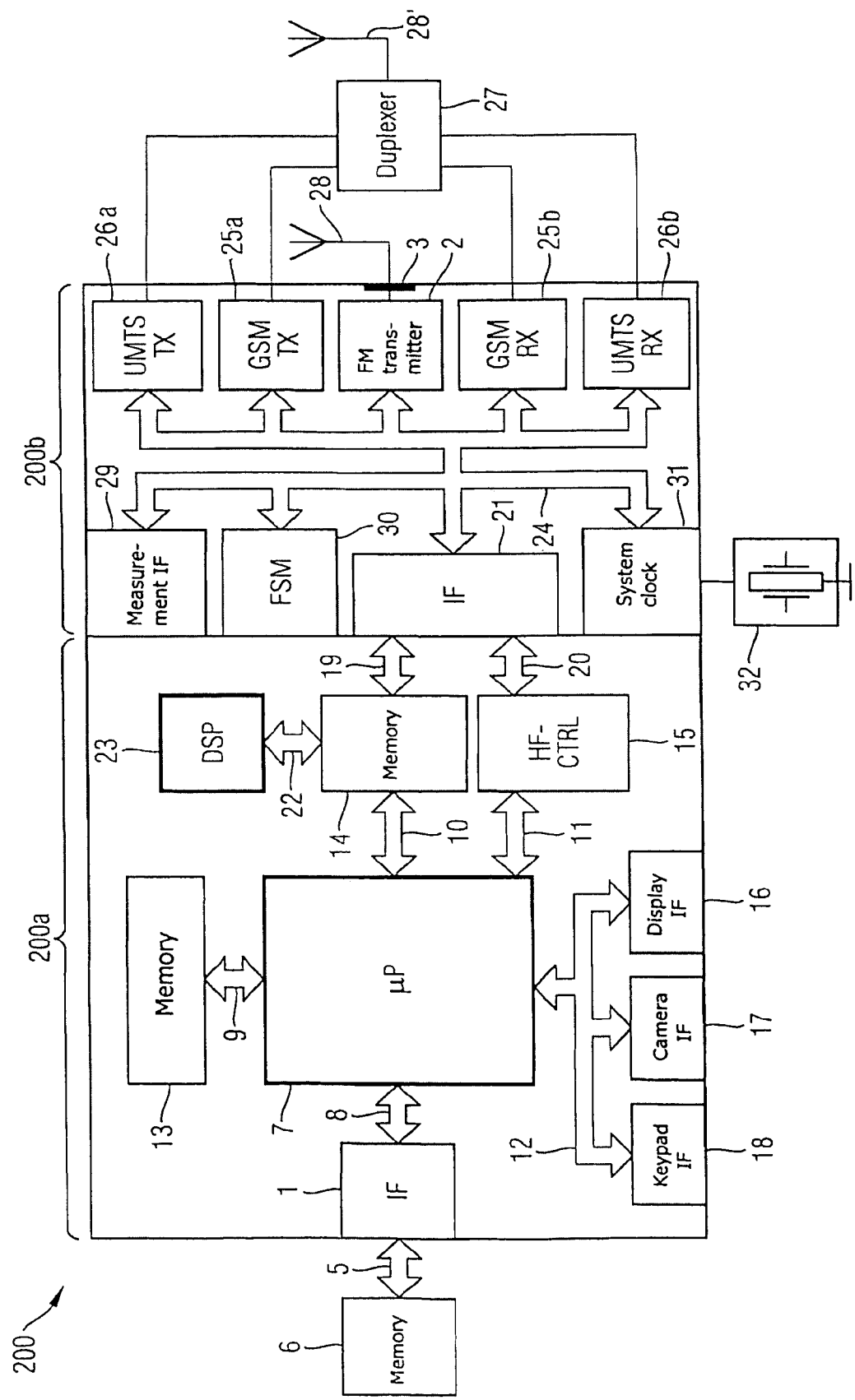
FIG. 2 shows a schematic illustration of an integrated circuit 200 as an exemplary embodiment.

FIG. 2 shows a schematic illustration of an integrated circuit 200 as an exemplary embodiment, as it may be integrated in a mobile radio transceiver, for example. The integrated circuit 200 includes two circuits 200a and 200b, the circuit 200a being coupled to a memory 6, particularly an external memory, via an interface 1 and a data bus 5. The circuit 200a includes a microprocessor 7 which is coupled to components 1, 13, 14, 15, 16, 17, 18 by means of data buses 8, 9, 10, 11, 12. In this case, the data bus 8 implements a coupling to the interface 1, the data bus 9 implements a coupling to a memory 13, the data bus 10 implements a coupling to a memory 14, the data bus 11 implements a coupling to a radio-frequency control unit 15 and the data bus 12 implements a coupling to a display interface 16, a camera interface 17 and a keypad interface 18. The memory 14 is connected by means of data buses 19 and 22 to a digital signal processor 23 and to an interface 21, which is coupled to the radio-frequency control unit 15 by means of a further data bus 20. Coupling between the circuits 200a and 200b is therefore implemented by the data buses 19 and 20.

The interface 21 is coupled to an FM (frequency modulation) transmitter 2, transmission units 25a, 26a and reception units 25b, 26b by means of a data bus 24. The labels TX and RX used in FIG. 2 and in the subsequent figures relate to the transmission mode (TX) and reception mode (RX) of the mobile radio transceiver during mobile radio operation. The FM transmitter 2 is coupled to an output 3, while the transmission units 25a, 26a and the reception units 25b, 26b are coupled to a duplexer 27. In addition, the output 3 is coupled to an antenna 28 and the duplexer 27 is coupled to an antenna 28'. The circuit 200b also includes a measurement interface 29, a state machine 30 and a system clock unit 31, which are respectively coupled by means of the data bus 24 to the other components of the circuit 200b. The system clock unit 31 is coupled to an external local oscillator 32.

The circuit 200a performs processing on signals in baseband (baseband assembly) and the circuit 200b performs processing on signals at least partially in the radio-frequency band (radio-frequency assembly). Within the baseband assembly, digital signal processing produces a low-frequency baseband signal from data which is to be processed and processes it. This signal is shifted to a radio frequency by units in the radio-frequency assembly.

In another embodiment, the two circuits 200a and 200b which the integrated circuit 200 includes may be in the form of two integrated circuits, i.e. may be implemented on physically separate substrates. In this case, the circuit 200 is provided in the form of two chips (which are frequently referred to in the art as the baseband chip and the radio-frequency chip).

In this context, it should be pointed out that a clear division between baseband assembly and radio-frequency assembly is not defined as standard in mobile radio engineering. Accordingly, the description of the figures has also not provided a standard definition of the baseband assembly and the radio-frequency assembly. One opportunity for delimitation between baseband assembly and radio-frequency assembly may be provided, by way of example, by the implementation of a standardized interface 21, e.g. on the basis of the DigRF Dual-Mode Baseband/RF IC Interface standard, which is yet to be explained. This interface 21 may be provided either as an "internal" interface in the case of a single integrated circuit 200 or, in the case of two integrated circuits 200a, 200b, as an interface between these two integrated circuits 200a, 200b.

The memory 6 may be integrated in the underlying mobile radio transceiver or may be in the form of an external memory. In one embodiment, the memory 6 may be in the form of a flash memory card or USB (Universal Serial Bus) stick which can be coupled to the integrated circuit 200 via the interface 1 and the data bus 5. The memory 6 can be used to store data in any format, for example compressed audio data in the MP3 (MPEG (Moving Picture Experts Group)-1 Audio Layer 3) format, the AAC (Advanced Audio Coding) format or another file format based on known audio data compression.

The data can be fed into the circuit 200a via the data bus 5 and the interface 1. The interface 1 therefore corresponds in terms of function to the input 1 in FIG. 1. The interface 1 may have both the properties of a data interface, a hardware interface, and of a software interface and forwards the data it receives to the microprocessor or microcontroller 7 via the data bus 8. The data buses in the integrated circuit 200 are bidirectional data buses in one embodiment.

The microprocessor 7 processes (for example decodes) the data received via the data bus 8 and via the interface 1. The data processed by the microprocessor 7 can finally be stored in the memory 13 via the data bus 9 or can be read from said memory. By way of example, the memory 13 may be in the form of an SRAM (Static Random Access Memory) in one embodiment.

Besides the data received via the data bus 8, the microprocessor 7 can receive and/or send further data via the data bus 12. By way of example, the keypad interface 18 can be used to receive the data input by a user of the mobile radio transceiver using a keypad. If the mobile radio transceiver includes an integrated camera, the camera interface 17 can be used to receive further data, for example, in the form of image files or film files. In addition, stored and/or processed data can be forwarded via the display interface 16 to a display on the mobile radio transceiver.

The digital signal processor 23 is used inter alia for digital signal processing within the baseband. Typical method steps in this signal processing are the encoding or interleaving of the data to be sent via the mobile radio transceiver, for example.

The microprocessor 7 can communicate with the digital signal processor 23 and interchange data via the data buses 10 and 22, said data preferably being payload data. In this case, the interposed memory 14 can be used both for storing the data from the microprocessor 7 and for storing the data from the digital signal processor 23. By way of example, the memory 14 may be in the form of an SRAM. Coupling the microprocessor 7 to the digital signal processor 23 therefore allows the data processing to be split flexibly between these two processors.

The microprocessor 7 receives and uses the data bus 11 to send data to a radio-frequency control unit 15, these data preferably being control data in digital form.

The memory 19 and the control unit 20 send payload data and control data to the interface 21 via the data bus 19 or 20. By way of example, the implementation of the interface 21 may be based on the known DigRF Dual-Mode Baseband/RF IC Interface standard, which defines a physical connection between baseband assemblies and radio-frequency assemblies in mobile radio transceivers. In this case, a DigRF interface provides logical channels for payload data, control data and also data for time-based control (timing) of the components in the baseband assembly and the radio-frequency assembly.

In FIG. 2, while the block representing the interface 21 is associated with the circuit 200b, such association not being mandatory. In general, the baseband assembly and the radio-frequency assembly include an interface. For the case of a two-chip solution for the integrated circuit 200 (i.e. the circuits 200a and 200b are integrated on separate semiconductor chips or semiconductor substrates), a physical connection between these two chips would be in the form of the interface 21.

The measurement interface 29 can be used to receive and/or send data for monitoring particular units of the mobile radio transceiver. By way of example, these data may be information relating to the temperatures in the mobile radio transceiver or to available battery voltages. Such data can be made available to the measurement interface 29 by external temperature or voltage sensors, for example.

The state machine 30 may be implemented in hardware and constructed from logic chips, gates, flip-flops, etc. By way of example, the state machine 30 can control the time-based control for the work steps of the components of the baseband assembly and of the radio-frequency assembly. To this end, the state machine 30 may include a timer, inter alia.

The external local oscillator 32 produces a clock signal at a reference frequency which can be converted in the system clock unit 31 into a system clock at a desired frequency. By way of example, the system clock can be used as input frequency for PLL frequency synthesizers (not shown explicitly) or for clocking digital/analogue converters or analogue/digital converters. In this case, the system clock unit 31 may also include a plurality of PLLs (Phase Locked Loops).

In the example shown in FIG. 2, the transmission units 25a, 26a and reception units 25b, 26b are provided respectively for the two mobile radio standards UMTS (Universal Mobile Telecommunications System) and GSM (Global System for Mobile Communications)/EDGE (Enhanced Data Rates for GSM Evolution). The mobile radio transceiver on which FIG. 2 is based is therefore a UMTS/GSM multimode system. It is also possible in other embodiments for other mobile radio standards or just a single mobile radio standard to be supported, however.

The transmission units 25a, 26a and reception units 25b, 26b may be of any design and may include both analogue and digital standard components. By way of example, the reception units 25b, 26b may include a reception signal path with a channel filter fed by an antenna, a down-converter for down-converting filtered received signals to an intermediate band or to baseband, an analogue/digital converter for converting the analogue received signal into a digital signal and one or more filters for filtering the received signals. The trans-mission units 25a, 26a may include a transmission signal path with one or more digital filters for filtering the transmission signals, a digital/analogue converter for converting the digital transmission signal into an analogue signal, an up-converter, for shifting the analogue transmission signal to the radio-frequency band, a channel filter for filtering the radio-frequency signal and a power amplifier for outputting the amplified signal to a transmission antenna.

The duplexer 27 coupled to the transmission units 25a, 26a and the reception units 25b, 26b decides which transmission and/or reception bands are selected and filtered during UMTS operation and GSM operation. By way of example, the selection and filtering can be performed by frequency-selective filters.

The FM transmitter 2 can receive digital audio data from the microprocessor 7 via the various data buses in the integrated circuit 200. Since the FM transmitter 2 converts the digital audio data into analogue frequency-modulated audio signals, it corresponds to the modulator 2 from FIG. 1. The analogue frequency-modulated signals are forwarded via the output 3 to the antenna 28 and are sent by the latter. The FM transmitter 2 may be designed in different ways and may include components of the radio-frequency assembly, i.e. of the transmission units 25a, 26a or of the reception units 25b, 26b, for example. However, it is also possible for transmission units 25a, 26a or the reception units 25b, 26b and the FM transmitter 2 to be completely separate units, i.e. to have no common functional elements.

Figure 3:
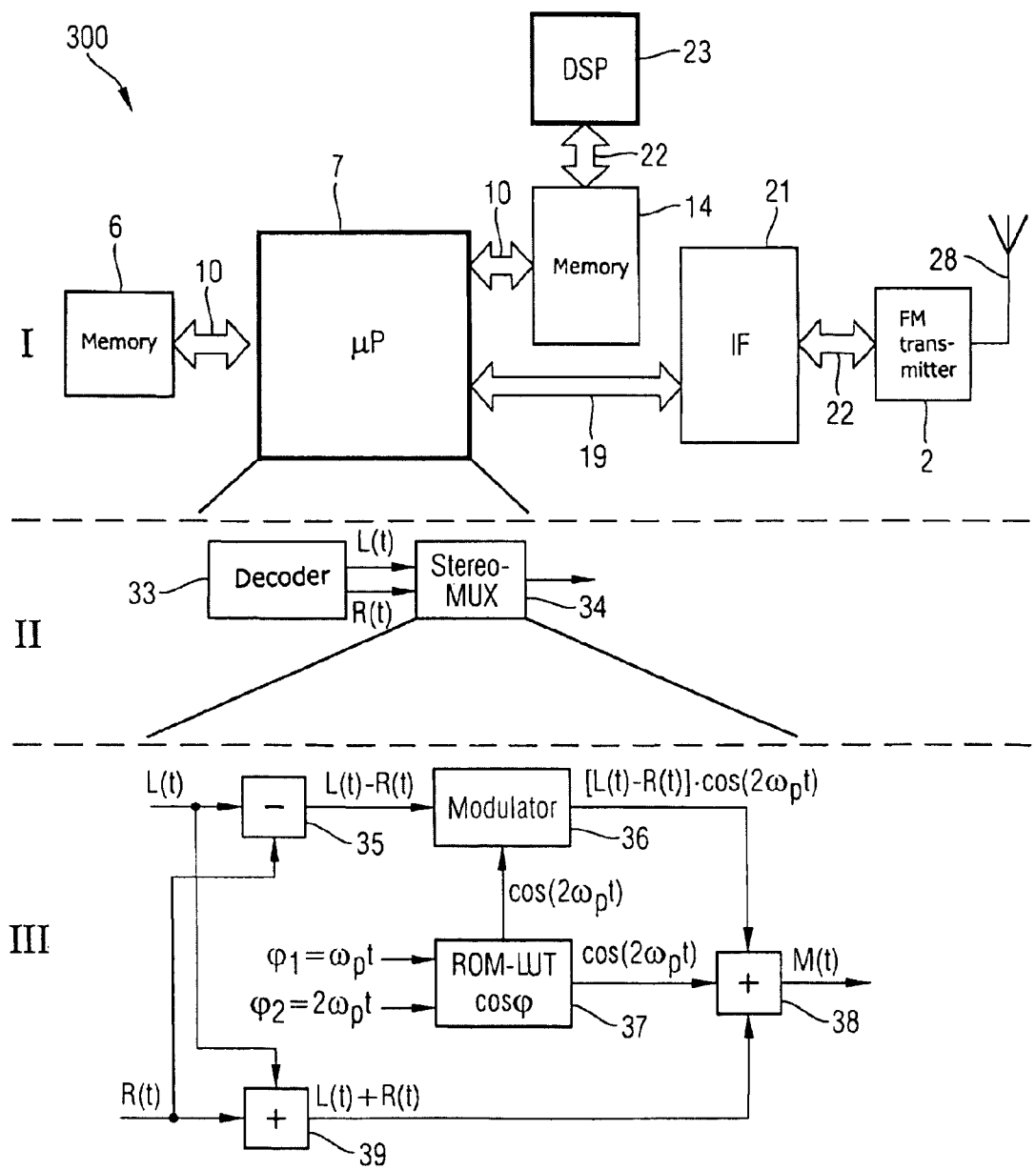
FIG. 3 shows a schematic illustration of a conversion of digital audio data into a digital stereo multiplex signal.

FIG. 3 shows a schematic illustration of a conversion of digital audio data into a digital stereo multiplex signal. The signal processing path of the conversion is divided into three signal processing paths I, II and III, with the respective lower signal processing path being a more detailed illustration of the respective signal processing path above it. The components shown in the signal processing path I correspond to the components in FIG. 2 which are denoted by the same reference signs. The specific numerical frequency values indicated in the description of FIG. 3 below are exemplary statements.

In the signal processing path I, audio data are first of all read from the memory 6 in the form of compressed audio files in any format and are forwarded to the microprocessor 7 via the data bus 10. The microprocessor 7 converts the received audio data into a digital stereo multiplex signal, the precise course of the conversion being shown by the signal processing paths II and III. The data buses 10, 22 and the memory 14 can be used for a communication between the microprocessor 7 and the digital signal processor 23. The digital stereo multiplex signal is supplied to the interface 21 via the data bus 19 and is forwarded to the FM transmitter 2 via the data bus 22. The FM transmitter 2 converts the digital stereo multiplex signal into analogue frequency-modulated audio signals which are sent via the antenna 28.

The signal processing path II shows a more detailed illustration of the conversion of the audio data which is performed in the microprocessor 7. A decoder 33 decompresses or decodes the compressed audio data received via the data bus 10. In one embodiment, the decompression or decoding is effected using algorithms on which the data compression used is based. However, the way in which the integrated circuit works is not dependent on the compression format used. The decoder 33 outputs a left-hand audio signal channel L(t) and a right-hand audio signal channel R(t), which are fed into the stereo multiplexer 34. The output of the stereo multiplexer 34 outputs the digital stereo multiplex signal to the data buses 10, 19.

The signal processing path III shows a more detailed illustration of the data processing performed in the stereo multiplexer 34. The left-hand audio signal channel L(t) and the right-hand audio signal channel R(t) are first of all processed in two different signal paths and are then combined to form a stereo multiplex signal M(t). In one embodiment, in the upper signal path, the right-hand audio signal channel R(t) is subtracted from the left-hand audio signal channel L(t) using a subtractor 35, and a resultant difference signal L(t)–R(t) is forwarded to a modulator 36. The modulator 36 amplitude-modulates the difference signal L(t)–R(t) on to a suppressed carrier $\cos(2\omega_p t)$ at a frequency of 38 kHz, for example, with a double-sideband suppressed carrier (DSBSC) signal [L(t)–R(t)]·$\cos(2\omega_p t)$ being produced in a frequency range from, by way of example 23 kHz to, by way of example, 53 kHz. The DSBSC signal [L(t)–R(t)]·$\cos(2\omega_p t)$ is forwarded to an adder 38.

The suppressed carrier $\cos(2\omega_p t)$ can be generated in different ways, the FIG. 3 indicating generation by means of a look-up table 37 (Look-Up Table (LUT)) according to one embodiment. Alternatively, the suppressed carrier $\cos(2\omega_p t)$ can be produced by components implemented in hardware, for example. The look-up table 37 can be used to produce carrier signals cos φ at different frequencies. By way of example, FIG. 3 indicates a pilot carrier $\cos(\omega_p t)$ at a frequency of 19 kHz and the suppressed carrier $\cos(2\omega_p t)$ at a frequency of 38 kHz by means of the two input values $\phi_1$ and $\phi_2$.

The look-up table 37 can be used to store the required function values of the pilot carrier $\cos(\omega_p t)$. In this embodiment, the memory space required for the look-up table 37 can be reduced on the basis of the periodicity of the cosine function by storing only a quarter of the cosine function therein. The suppressed carrier $\cos(2\omega_p t)$ at double frequency can be calculated by shifting the argument of the cosine value stored in binary form by one bit.

Besides the suppressed carrier $\cos(2\omega_p t)$ which is required for the signal processing in the upper signal path, the look-up table 37 additionally forwards the pilot carrier $\cos(\omega_p t)$ to the adder 38. In the embodiment described, the pilot carrier $\cos(\omega_p t)$ is generated at a frequency of 19 kHz, i.e. half the frequency of the suppressed carrier $\cos(2\omega_p t)$, and also with a precisely prescribed phase relationship.

In one embodiment, in the lower signal path, the right-hand audio signal channel R(t) and the left-hand audio signal channel L(t) are added by the adder 39 to form a summed signal L(t)+R(t), which is forwarded to the adder 38. The summed signal L(t)+R(t) is a baseband audio signal in a frequency range from 30 Hz to 15 kHz, for example. The adder 38 adds the DSBSC signal $[L(t)-R(t)] \cdot \cos(2\omega_p t)$, the pilot carrier cos $(\omega_p t)$ and the summed signal L(t)+R(t) to form the stereo multiplex signal M(t), which is forwarded via the data buses 10 and 19 (cf. signal path I).

Figure 4:
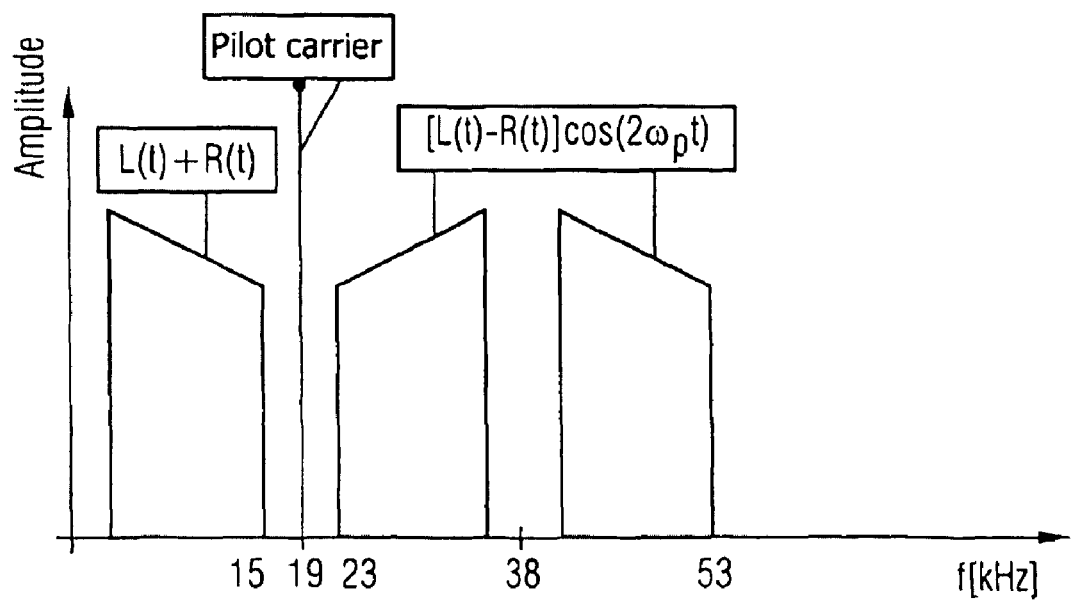
FIG. 4 shows a schematic illustration of a spectrum of a stereo multiplex signal.

FIG. 4 shows a schematic illustration of a spectrum of a stereo multiplex signal M(t) produced as shown in FIG. 3 according to one embodiment. For the spectrum shown, a unitless signal strength or signal amplitude is plotted against the frequency in the unit kHz. The left-hand side of the graph shows the summed signal L(t)+R(t), which is in a frequency range from 30 Hz to 15 kHz, for example. At a frequency value of 19 kHz, the pilot carrier is shown in the form of a sharp spike. The DSBSC signal $[L(t)-R(t)] \cdot \cos(2\omega_p t)$ shown on the right-hand includes two sidebands produced during the double-sideband modulation. The two sidebands are arranged symmetrically around the carrier frequency of the suppressed carrier $\cos(2\omega_p t)$ of 38 kHz.

Figure 5B:
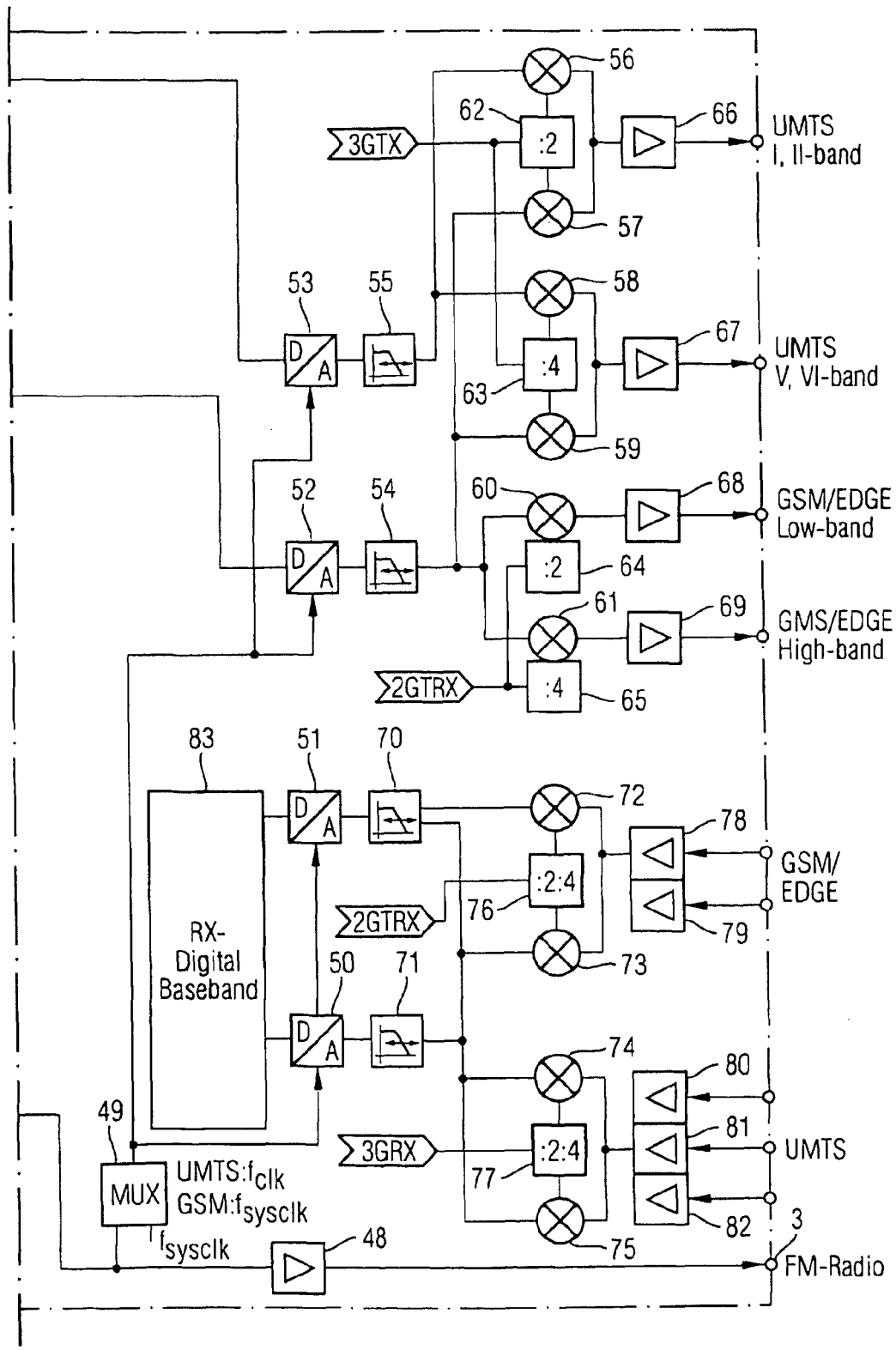
FIG. 5 shows a schematic illustration of an integrated circuit 500 as an exemplary embodiment.

FIG. 5 shows a schematic illustration of an integrated circuit 500 as an exemplary embodiment, as it may be integrated in a mobile radio transceiver, for example. Components known from the preceding figures are identified by means of the reference signs used therein. FIG. 5 should be read in conjunction with the preceding figures, components from other figures of the application not needed to be shown explicitly, for reasons of clarity.

The integrated circuit 500 is coupled to external local oscillators 32, 32' which produce a first system clock $f_{sysclk}$ and a second system clock $f_{sleep}$. By way of example, the second system clock $f_{sleep}$ ("sleep clock") can support functions of the mobile radio transceiver which are also intended to be available when a mobile radio transceiver is in a switched-off state. An interface 21 and a data bus 19 connect the integrated circuit 500 to a microprocessor 7. The interface 21 has a FIFO (First-in, First-out) buffer 40 coupled to it which is connected to a control unit 42 by means of a data bus 41.

In the bottommost signal path, the FIFO buffer 40 is connected to an adder 43 in a PLL frequency synthesizer 2 by means of a line. The PLL frequency synthesizer 2 includes a sigma-delta modulator 44, a circuit component 45, a voltage-controlled oscillator 46 and a frequency divider 47. The circuit component 45 is supplied with the first system clock $f_{sysclk}$, and the adder 43 is supplied with a channel word FM-CHW. The output of the PLL frequency synthesizer 2 outputs a clock signal $f_{clk}$ or a frequency-modulated analogue audio transmission signal, depending on the mode of operation. The functional relationships between the individual components of the PLL frequency synthesizer 2 and the way in which the latter works are explained later in the context of FIGS. 6 to 8. The output of the PLL synthesizer 2 is connected to an amplifier 48, which is coupled to an output 3 of the integrated circuit 500.

The output of the PLL frequency synthesizer 2 is also connected to a first input of a multiplexer 49, whose second input is supplied with the first system clock $f_{sysclk}$. The output of the multiplexer 49 is supplied to the clock inputs of digital/analogue converters 50, 51, 52, 53, which are connected in signal paths for sending (UMTS I, II band, UMTS V, VI band, GSM/EDGE low band, GSM/EDGE high band) and receiving mobile radio data (GSM/EDGE, UMTS) during mobile radio operation of the mobile radio transceiver. The digital/analogue converters 50, 51, 52, 53 represent the interface between analogue and digital data processing within these signal paths.

The digital/analogue converters 52, 53 in the transmission paths have a respective one of the low-pass filters 54, 55 with an adjustable filter characteristic connected downstream of them, the outputs of which are coupled to modulators in the signal paths. The modulators include mixers 56, 57, 58, 59, 60, 61, two adders (not shown) and frequency dividers 62, 63, 64, 65, the modulators having a respective one of the amplifiers 66, 67, 68, 69 connected downstream of them. The outputs of the amplifiers 66, 67, 68, 69 are connected to outputs of the integrated circuit 500, which are coupled to antennas (not shown). The inputs of each of the frequency dividers 62, 63 and 64, 65 are used to supply them with one of the carrier signals 3GTX or 2GTRX. In this case, the label 3GTX denotes the 3rd Generation (3G) standard UMTS and the transmission mode (TX), while the label 2GTRX denotes the 2nd Generation (2G) standard GSM and the transmission (TX) and reception (RX) mode.

The digital/analogue converters 50, 51 in the reception paths have a respective one of the low-pass filters 70, 71 with an adjustable filter characteristic connected upstream of them, the inputs of which are coupled to demodulators in the individual signal paths. The demodulators include mixers 72, 73, 74, 75 and frequency dividers 76, 77, which have the respective amplifiers 78, 79 and 80, 81, 82 connected upstream of them. The inputs of the amplifiers 78, 79, 80, 81, 82 are connected to inputs of the integrated circuit 500, which are coupled to antennas (not shown). The inputs of each of the frequency dividers 76, 77 are used to supply them with one of the carrier signals 2GTRX and 3GRX. In this case, the label 3GRX denotes the 3rd Generation (3G) standard UMTS and the reception mode (RX). The outputs of the digital/analogue converters 50, 51 are connected to a baseband unit 83, in which digital reception signals are processed in baseband. The baseband unit 83 may be connected to the interface 21 (in a manner which is not shown).

The integrated circuit 500 also includes a PLL frequency synthesizer 84, which is provided for producing a mixed signal for UMTS reception. The PLL frequency synthesizer 84 includes a sigma-delta modulator 85, a circuit component 86 and a voltage-controlled oscillator 87. The circuit component 86 is supplied with the first system clock $f_{sysclk}$, and the sigma-delta modulator 85 is supplied with a channel word CHW. The output of the PLL frequency synthesizer 84 outputs a signal 3GRX which is supplied to the frequency divider 77 in the UMTS reception signal path as a mixed signal.

The integrated circuit 500 also includes a PLL frequency synthesizer 88 which has two functions, namely to produce a mixed signal for the UMTS transmission operation and to produce a mixed signal for the GSM transmission and reception operation. The PLL frequency synthesizer 88 has an adder 89, a sigma-delta modulator 90, a circuit component 91 and a voltage-controlled oscillator 92. The circuit component 91 is supplied with the first system clock $f_{sysclk}$, and the adder 89 is supplied with a channel word CHW and with a further signal from the output of a multiplexer 93. The output of the PLL frequency synthesizer 88 outputs two mixed signals 2GTRX and 3GTX, which are supplied to the frequency dividers 62, 65, 76.

The FIFO buffer 40 has a baseband unit 94 connected downstream of it which processes digital transmission signals in the baseband. The baseband unit 94 is connected to the FIFO buffer 40 by means of three lines which are used to feed the digital transmission signals into three signal paths for the unit. The bottommost signal path processes the data on the basis of the GSM standard. In this case, a GMSK (Gaussian Minimum Shift Keying) modulator 95 is connected in the signal path, which is coupled to the multiplexer 93.

The middle signal path processes the data on the basis of the GSM/EDGE standard. The signal path first of all has an 8-PSK (Phase Shift Keying) modulator 96 and a CORDIC (Coordinate Rotation Digital Computer) unit 97 connected in it. A first output of the CORDIC unit 97 is connected to a high-pass filter 98 coupled to the multiplexer 93, while a second output of the CORDIC unit 97 is coupled to a delay adjustment unit 99 (DA). The delay adjustment unit 99 has a correction unit 101 for amplitude and frequency correction (ACOR, OCOR) and an interpolation/noise-shaping unit 102 for interpolation (IP) and noise shaping (NS) connected downstream of it. The output of the interpolation/noise-shaping unit 102 is coupled to an input of a multiplexer 103.

The topmost signal path includes a data processing section based on the UMTS standard. The signal path has an RRC (Root Raised Cosine) filter 104, a data-rate converter 105 for data-rate conversion (sample rate converter (SRC)) and for time adjustment (TA), a correction unit 106 for amplitude correction and frequency correction (ACOR, OCOR) and an interpolation/noise-shaping unit 107 for interpolation (IP), noise shaping (NS) and production of an I (Inphase) and a Q (Quadrature) component connected in it. A first output of the interpolation/noise-shaping unit 107 is connected to an input of the multiplexer 103, while a second output is connected to the input of the digital/analogue converter 53. The output of the multiplexer 103 is coupled to the digital/analogue converter 52.

It should be noted that the integrated circuit 500 can be modified in a wide variety of ways. By way of example, the relative arrangement, the interaction and the communication among the components may be altered. It should also be noted that if direct coupling between components of the circuit 500 is absent or is not explicitly shown then this does not necessarily mean that no data interchange can take place between these components. For reasons of clarity, some couplings between particular components which appear obvious to a person skilled in the art have not been shown explicitly. By way of example, the baseband unit 83 can forward digital reception data processed in baseband to the interface 21 so that these data are made available to a digital signal processor 23 as shown in FIG. 2 for further processing.

The integrated circuit 500 has the functionalities of a UMTS-GSM/EDGE multimode transceiver, i.e. the integrated circuit 500 can perform signal processing operations on received signals and transmission signals in the radio-frequency band and in baseband in line with the UMTS standard and the GSM/EDGE standard, depending on the chosen transmission standard. During mobile radio transmission, transmission data are fed into the integrated circuit 500 on the interface 21 and are forwarded to the baseband unit 94 via the FIFO buffer 40. The reading-in and reading-out of data into and from the FIFO buffer 40 is controlled by the control unit 42. The transmission data are then processed in one of the three upper signal paths coupled to the FIFO memory 40 on the basis of the chosen transmission standard and passed through the components arranged in the respective signal path.

When the mobile radio transceiver is in a transmission mode based on the UMTS standard, transmission data pass through the upper signal path containing the components 103, 104, 105, 106, 107. The RRC filter 104 first of all performs pulse shaping on the data signal in order to minimize inter-symbol interference. The data rate converter 105 then adapts the data rate and performs time adjustment. The signal then passes through the correction unit 106, in which the signal power is adapted by means of amplitude and offset correction. The interpolation/noise-shaping unit 107 then performs interpolation and noise shaping on the transmission data. In this case, said noise shaping can shift the noise in the signal, for example, to a particular frequency range in order to be filtered by a downstream filter (not shown).

The output of the interpolation/noise-shaping unit 107 outputs an I (Inphase) component and a Q (Quadrature) component of the transmission signal, which are forwarded to the digital/analogue converters 52, 53 so as to be converted into analogue signals by these. In this case, the multiplexer 103 forwards a signal component which is output by the interpolation/noise-shaping unit 107 to the digital/analogue converter 52 only for the case of the UMTS mode of operation. The low-pass filters 54 and 55 attenuate signal portions of the signal components at high frequencies. The I and Q components are then up-converted to the carrier frequency 3GTX provided by the PLL frequency synthesizer 88 by the vector modulator 56, 57, 62 and the vector modulator 58, 59, 63. Appropriate division factors of the frequency dividers 62, 63 mix the components of the data signal into the frequency ranges of the UMTS bands I, II-band and UMTS V VI-band.

Following the up-conversion, the up-converted I and Q components are summed by adders (not shown) and are regulated by one of the amplifiers 66, 67 to the desired signal strength. The analogue radio-frequency transmission signals are then sent by means of antennas (not shown).

When the mobile radio transceiver is in a transmission mode based on the GSM/EDGE standard, transmission data passes through the middle signal path containing the components 96, 97, 98, 99, 101, 102, 103. First of all, the transmission data are phase-modulated by the 8-PSK modulator 96 on the basis of the known 8-PSK method, with a symbol of the phase-modulated signal representing three bits. The two outputs of the 8-PSK modulator 96 output two components, which are frequency-corrected and phase-corrected by the CORDIC unit 97. The outputs of the CORDIC unit 97 likewise output two components of the transmission signal, in similar fashion to the 8-PSK modulator 96.

The first signal component is subjected to delay adjustment by the delay adjustment unit 99, and then, in similar fashion to the UMTS transmission mode described above, the units 101, 102, 103, 52, 54, 61, 65, 69 connected downstream of the delay adjustment unit 99 process the first signal component. In this case, the multiplexer 103 forwards the signal component which is output by the interpolation/noise-shaping unit 102 to the digital/analogue converter 52 only for the case of GSM/EDGE mode of operation. The analogue radio-frequency transmission signals are sent at the output GSM/EDGE high-band by an antenna (not shown).

The second signal component which is output by the CORDIC unit 97 passes through the high-pass filter 98, which attenuates signal portions at low frequencies. The filtered data is forwarded to the PLL frequency synthesizer 88 by the multiplexer 93 only for the case of a GSM/EDGE mode of operation.

When the mobile radio transceiver is in a transmission mode based on the GSM standard, transmission data passes through the lower signal path containing the component 95. In this case, the transmission data are phase-modulated by the GMSK modulator 95 on the basis of the known GMSK method. The multiplexer 93 forwards the signal component which is output by the GMSK modulator 95 to the PLL frequency synthesizer 88 only for the case of a GSM mode of operation.

When the mobile radio transceiver is in a reception mode based on the UMTS standard, reception data is processed in a manner which is the inverse of the UMTS transmission mode described above. The reception data is received by antennas (not shown) and is forwarded to the amplifiers 80, 81, 82. Next, the reception signals are combined to form one signal by an adder (not shown) and are down-converted to an intermediate band or to the baseband by the vector demodulators 74, 75, 77. For this purpose, the frequency divider 77 provides appropriate division factors and the PLL frequency synthesizer 88 provides the carrier frequency 3GRX. The signal components which are output by the vector demodulator 74, 75, 77 are filtered by the low-pass filters 70, 71 and are converted into digital signals by the digital/analogue converters 50, 51. Next, the digital baseband signals are processed by the baseband unit 83 in a manner which is the inverse of the UMTS transmission mode described above. The baseband signals processed by the baseband unit 83 are forwarded to the FIFO buffer 40 via a line (not shown).

When the mobile radio transceiver is in a reception mode based on the GSM/EDGE standard, reception data is processed in a manner which is the inverse of the GSM/EDGE transmission mode described above. The reception data is received by antennas (not shown) and is forwarded to the amplifiers 78, 79. Next, the received signals are combined to form one signal by an adder (not shown) and are down-converted to an intermediate band or to the baseband by the vector demodulator 72, 73, 76. For this purpose, the frequency divider 76 provides appropriate division factors and the PLL frequency synthesizer 88 provides the carrier frequency 2GTRX. The signal components which are output by the vector demodulator 72, 73, 76 are filtered by the low-pass filters 70, 71 and are converted into digital signals by the digital/analogue converters 50, 51. Next, the digital baseband signals output by the digital/analogue converts 50, 51 are processed by the baseband unit 83 in a manner which is the inverse of the GSM/EDGE transmission mode which is described above. The baseband signals processed by the baseband unit 83 are forwarded to the FIFO buffer 40 via a line (not shown).

In the case of mobile radio operation based on the UMTS standard the PLL frequency synthesizers 84, 88 provide the carrier frequencies 3GRX, 3GTX. A detailed description of the basic way in which the PLL frequency synthesizers 84, 88 work is provided by the description of the FIGS. 6, 7, 8. The PLL frequency synthesizers 84, 88 differ in that the PLL frequency synthesizer 88 additionally can receive data to be modulated besides the channel word CHW (in the case of the GSM/EDGE transmission mode), i.e. the output signal 3GTX can be based both on the channel word CHW and on the data modulated on. In contrast to this, the PLL frequency synthesizer 84 outputs a mixed signal 3GRX which is based only on the channel word CHW.

During mobile radio operation within the framework of the UMTS standard, the PLL frequency synthesizer 2 provides the clock signal $f_{clk}$ for clocking the digital/analogue converters 50, 51, 52, 54. In contrast to this, in the case of mobile radio operation within the framework of the GSM/EDGE standard, the first system clock $f_{sysclk}$ produced by the local oscillator 32, is used for clocking the digital/analogue converters 50, 51, 52, 54. The clock signal supplied to the digital/analogue converters 50, 51, 52, 54 is selected by the multiplexer 49 according to the transmission standard. By way of example, the PLL frequency synthesizer 2 may be implemented by an integrated ring oscillator at a frequency of 312 MHz, for example. A detailed description of the basic way in which the PLL frequency synthesizer 2 works is provided by the description of FIGS. 6, 7, 8.

On the basis of the TDMA (Time Division Multiple Access) method used within the framework of GSM/EDGE data transmission, said transmission standard does not involve any simultaneous sending and receiving of data. For the case of mobile radio operation based on the GSM/EDGE standard, the required carrier frequency 2GTRX can therefore be provided by a single PLL frequency synthesizer 88 in one embodiment. Consequently, the PLL frequency synthesizer 84 can be switched off during GSM/EDGE mobile radio operation.

If the integrated circuit 500 is intended to produce analogue frequency-modulated audio data, the data bus 19 is used to receive digital audio data and to forward them to the PLL frequency synthesizer 2. The PLL frequency synthesizer 2 converts the digital audio data into analogue frequency-modulated audio signals, the basic way in which the frequency modulation of the PLL frequency synthesizer 2 works being provided by the description of the FIGS. 6, 7, 8. In this case, the analogue frequency-modulated signals produced by the PLL frequency synthesizer 2 are based on the digital audio data supplied to the adder 43 and on a channel word FM/CHW which stipulates the frequency range of the frequency modulation. The PLL frequency synthesizer 2 is thus used both as a component of the radio-frequency assembly within the framework of mobile radio transmission and for converting the digital audio data.

Next, PLL frequency synthesizer 2 forwards the analogue frequency-modulated audio signals to the amplifier 48, which regulates the power of the audio signals. An exemplary power value for analogue frequency-modulated audio signals sent by the mobile radio transceiver is 50 nW or −43 dBm, in one embodiment. Finally, the analogue frequency-modulated audio signals are sent via an antenna (not shown), said antenna being a VHF antenna or VHF band II antenna, in one embodiment, which is designed for a frequency in the region of 100 MHz, for example. It should be pointed out that the analogue frequency-modulated audio signals alternatively can be sent via one of the mobile radio transceiver's mobile radio antennas used during mobile radio operation. To this end, the output of the PLL frequency synthesizer 2 needs to be coupled to one of the amplifiers 66, 67, 68, 69. A mobile radio antenna of this kind may be designed for a frequency in the region of 900 MHz, for example.

The frequency range of electromagnetic waves from approximately 30 MHz to approximately 300 MHz is known by the name VHF (Very High Frequency). In this case, the frequency band from approximately 88 MHz to approximately 108 MHz denotes VHF band II, which is used for VHF radio. in one embodiment, the frequency range of the analogue frequency-modulated audio data is preferably within the VHF band II. For this case and the embodiment of the PLL frequency synthesizer 2 described above using a ring oscillator at a frequency of 312 MHz, for example, the signal which is output by the voltage-controlled oscillator 46 needs to be divided by the factor three using the frequency divider 47 in order to be at a frequency of 104 MHz in the desired VHF band II.

In the integrated circuit 500, the radio-frequency assembly (i.e. the components which are downstream of the interface 21 or are arranged to the right of the interface 21) and the PLL frequency synthesizer 2, which converts digital audio data into analogue frequency-modulated audio data, are implemented on the same integrated circuit 500 (i.e. on the same substrate).

Figure 6:
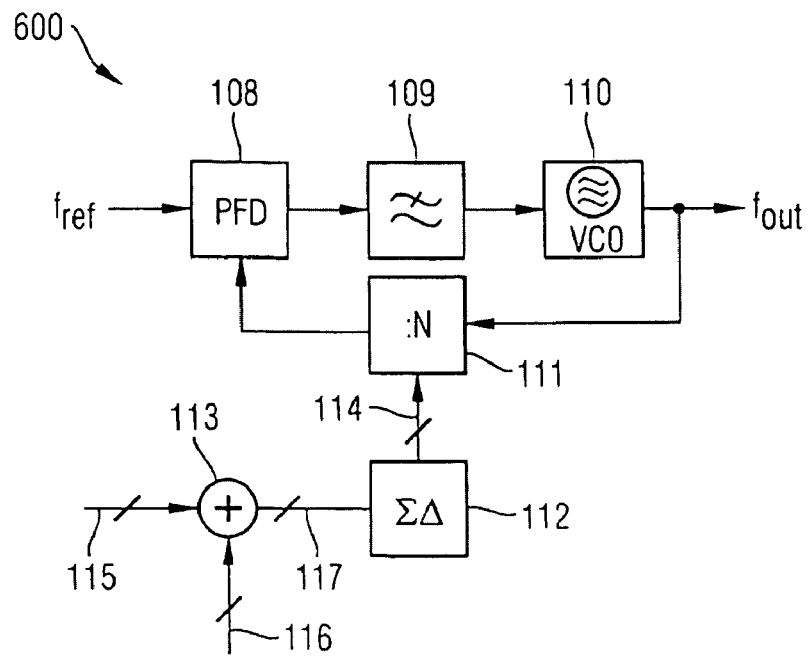
FIG. 6 shows a schematic illustration of an analogue PLL frequency synthesizer 600.

FIG. 6 shows a schematic illustration of an analogue PLL frequency synthesizer 600, as it can be used to convert a digital stereo multiplex signal into an analogue frequency-modulated audio signal, for example. The PLL frequency synthesizer 600 includes a PLL circuit which is constructed from a phase detector (phase frequency detector (PFD)) 108, a loop filter 109, a voltage-controlled oscillator 110 and a frequency divider 111. The frequency divider 111 has a sigma-delta modulator 112 coupled to it which has an adder 113 connected upstream of it. An input is used to supply the PLL frequency synthesizer 600 with a signal at the frequency $f_{ref}$, while an output outputs a signal at the frequency $f_{out}$.

The analogue PLL frequency synthesizer 600 is one possible exemplary embodiment of the modulator 2 (disregarding the frequency divider 47) from the other figures in the application. When the PLL frequency synthesizer 600 is compared with the PLL frequency synthesizer 2 in FIG. 5, it is possible to identify particularly the frequency $f_{ref}$ with the first system clock $f_{sysclk}$, the frequency $f_{out}$ with the frequency $f_{clk}$ and the components 108, 109 with the circuit component 45.

The first input of the phase detector 108 receives a reference signal at the frequency $f_{ref}$ which is produced by a local oscillator 32 such as the one from FIG. 5, for example. At a second input, the phase detector 108 receives the feedback signal from the PLL circuit. The phase detector 108 compares the phases of the two signals applied to its inputs or their frequencies and outputs a control signal which corresponds to the phase difference between the two received signals. By way of example, the control signal can be produced using a charge pump (not shown) and is supplied to the loop filter 109, in the form of a low-pass filter, so as to be smoothed thereby. The smoothed signal is supplied to the voltage-controlled oscillator 110, whose output signal firstly corresponds to the output signal from the PLL frequency synthesizer 600 at the frequency $f_{out}$ and secondly is fed back via an (in particular programmable) frequency divider 111 to the phase detector as a frequency divider signal. By way of example, the frequency divider 111 may be in the form of a fractional-N multimodulus frequency divider.

The frequency $f_{out}$ of the output signal corresponds to the multiple of the frequency $f_{ref}$ of the reference signal which multiple is stipulated by the division factor of the frequency divider 111. The PLL frequency synthesizer 600 can be used as a frequency modulator by virtue of the frequency divider 111 being actuated or programmed by a modulation signal 114 from the sigma-delta modulator 112. The actuation by the modulation signal 114 prompts the value N on which the frequency division by the frequency divider 111 is based to be altered and prompts an accordingly frequency-modulated signal to be output by the PLL frequency synthesizer 600.

In one embodiment, to produce the modulation signal 114, the adder 113 first of all sums a channel word 115 and the data 116 to be modulated to form a signal 117. In this case, the channel word corresponds to a digital signal which includes the information for the desired frequency channel. By way of example, the data to be modulated may correspond to a digital stereo multiplex signal. The signal 117 is supplied to the sigma-delta modulator 112, which produces the modulation signal 114 used for actuating the frequency divider 111.

Figure 7:
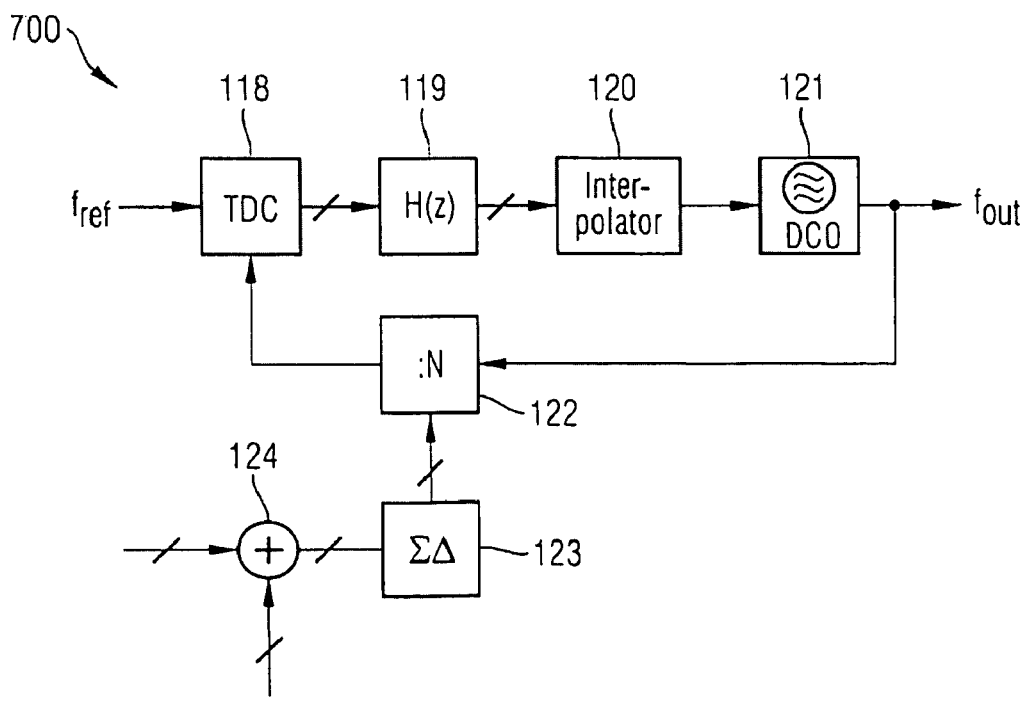
FIG. 7 shows a schematic illustration of a digital PLL frequency synthesizer 700.

FIG. 7 shows a schematic illustration of a further digital frequency synthesizer 700, as it may be used to convert a digital stereo multiplex signal into an analogue frequency-modulated audio signal, for example. In terms of function, the PLL frequency synthesizer 700 corresponds to the modulator 2 from the other figures in the application. The PLL frequency synthesizer 700 includes a PLL circuit which is constructed from a time-to-digital converter (TDC) 118, a digital loop filter 199, an interpolator 120, a digitally controlled oscillator (DCO) 121 and a frequency divider 122. The frequency divider 122 has a sigma-delta modulator 123 coupled to it, which has an adder 124 connected upstream of it.

The way in which the PLL frequency synthesizer 700 works is similar to the way in which the PLL frequency synthesizer 600 in FIG. 6 works. The first input of the TDC 118 receives a reference signal at a frequency $f_{ref}$, which is produced by a local oscillator 32 such as the one from FIG. 5, for example. The second input of the TDC 118 receives the feedback signal from the PLL circuit. The TDC 118 compares the phases of the two signals applied to its inputs resp. their frequencies and outputs a digital control signal corresponding to the phase difference between the two received signals.

The digital control signal is filtered by a digital loop filter with a freely selectable transfer function H(z). The choice of transfer function H(z) allows the amplitude and phase of the signal to be altered according to need. The filtered signal is interpolated by the interpolator 120 and is then supplied to the DCO 121 whose output signal firstly corresponds to the output signal from the PLL frequency synthesizer 700 at the frequency $f_{out}$ and secondly is fed back via a (programmable) frequency divider 122 to the TDC 118 as a frequency divider signal.

By way of example, the frequency divider 111 may be in the form of a multimodulus fractional N frequency divider. The PLL frequency synthesizer 700 can be used as a frequency modulator, with the associated method steps corresponding to the ones already described above for a frequency modulation by the PLL frequency synthesizer 600.

Figure 8:
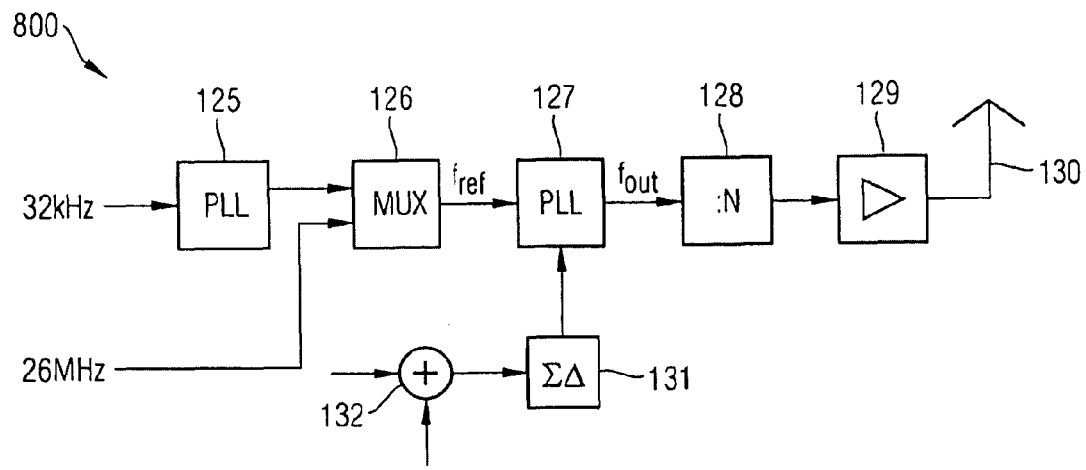
FIG. 8 shows a schematic illustration of a PLL frequency synthesizer 800.

FIG. 8 shows a schematic illustration of a third frequency synthesizer 800, as it may be used to convert a digital stereo multiplex signal into an analogue frequency-modulated audio signal, for example. In terms of function, the PLL frequency synthesizer 800 corresponds to the modulator 2 from the other figures in the application. The PLL frequency synthesizer 800 includes a first PLL circuit 125, a multiplexer 126, a second PLL circuit 127, a frequency divider 128, an amplifier 129 and an antenna 130, said components being connected in series. The second PLL circuit 127 has a sigma-delta modulator 131 coupled to it, which has an adder 132 connected upstream of it.

The first (lower) input of the multiplexer 126 has a first reference signal applied to it at a first frequency of 26 MHz, for example. In this case, the frequency value of 26 MHz is intended merely to convey an order of magnitude for the first frequency and is freely selectable in principle. Other possible values for the first frequency are 19.2 MHz and 38.4 MHz, for example. The first reference signal can be produced by the local oscillator 32 (see FIG. 5), for example. The second (upper) input of the multiplexer 126 has a second reference signal applied to it, whose frequency is in the order of magnitude of the first frequency but does not need to be identical to it.

The second reference signal is produced by a first PLL circuit 125 which is connected upstream of the multiplexer 126 and which converts an input signal at a frequency of 32 kHz, for example. In this case, the frequency value of 32 kHz is intended merely to convey an order of magnitude for the second frequency and is freely selectable in principle. By way of example, the second reference signal can be produced by the local oscillator 32' in FIG. 5 ("sleep clock"). The embodiment of the first PLL circuit 125 is arbitrary and may correspond to those in FIGS. 6 and 7, for example. In addition, the input signal can be converted using an FLL (Frequency Locked Loop) circuit instead of the first PLL circuit 125.

The multiplexer 126 forwards one of the two signals fed into its inputs at a reference frequency $f_{ref}$ to the second PLL circuit 127, the embodiment of which is arbitrary and corresponds to those in FIGS. 6 and 7, for example. In similar fashion to the PLL frequency synthesizers 600 and 700 in FIGS. 6 and 7, the second PLL circuit 127 can be used as a frequency modulator by virtue of the sigma-delta modulator 131 actuating it using a modulation signal. The way in which the frequency modulation works in this case is similar to those in FIGS. 6 and 7.

The PLL circuit 127 forwards an output signal at a frequency $f_{out}$ to a frequency divider 128 which is (optionally) connected in the signal path and which divides the frequency of the output signal by an integer value N. Next, the power of the signal is regulated via the amplifier 129 and sent via the antenna 130.

Figure 9:
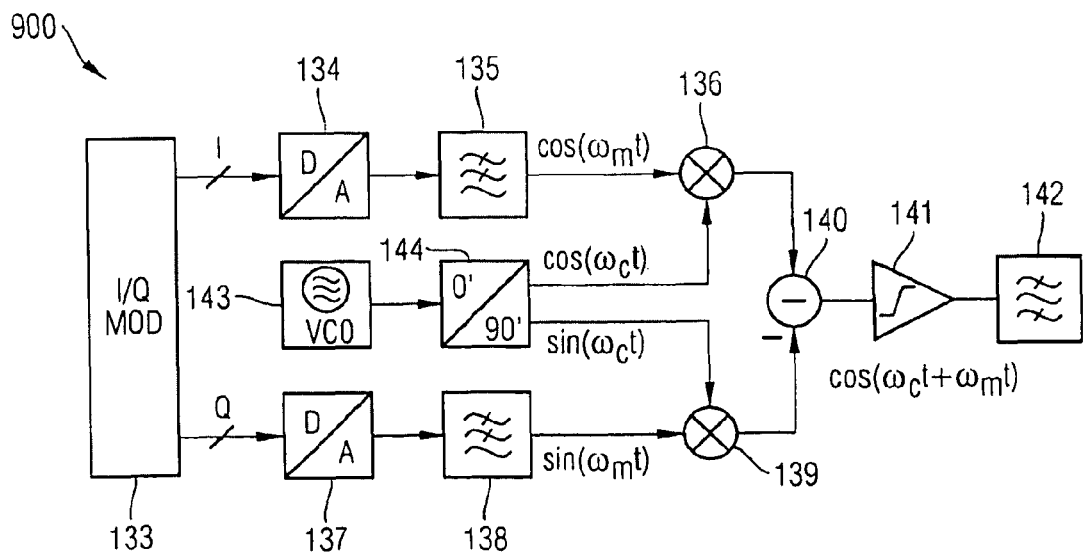
FIG. 9 shows a schematic illustration of an IQ vector modulator 900.

FIG. 9 shows a schematic illustration of an IQ vector modulator 900, as it can be used to convert a digital stereo multiplex signal into an analogue frequency-modulated audio signal, for example. In terms of function, the IQ vector modulator 900 therefore corresponds to the modulator 2 from the other figures in the application. The IQ vector modulator 900 includes an IQ modulator 133, which has a first digital/analogue converter 134, a first low-pass filter 135 and a first mixer 136 connected downstream of it in an upper signal path. In a lower signal path, the IQ modulator 133 has a second digital/analogue converter 137, a second low-pass filter 138 and a second mixer 139 connected downstream of it in similar fashion to the upper signal path. The signals output by the mixers 136, 139 are subtracted from one another in a subtractor 140, which has an amplifier 141, a bandpass filter 142 and an antenna (not shown) connected downstream of it. In a further signal path, a voltage-controlled oscillator 143 has a phase shifter 144 connected downstream of it, whose outputs are coupled to the adders 136, 139.

The IQ modulator 133 is fed with a digital data signal which is broken down by the IQ modulator 133 into an I component and a Q component perpendicular thereto. The I component and the Q component are respectively converted by the digital/analogue converters 134, 137 into analogue signals which are filtered by the low-pass filters 135, 138. The outputs of the low-pass filters 135, 138 output signals $\cos(\omega_m t)$ and $\sin(\omega_m t)$ at the modulation frequency $\omega_m$ which are perpendicular to one another. In the middle signal path, the voltage-controlled oscillator 143 produces a carrier signal at a carrier frequency $\omega_c$ which is broken down by the phase shifter 144 into two signals $\cos(\omega_c t)$ and $\sin(\omega_c t)$ which are perpendicular to one another.

In the upper path, the two signals $\cos(\omega_m t)$ and $\cos(\omega_c t)$ are summed by the adder 136, while in the lower path, the two signals $\sin(\omega_m t)$ and $\sin(\omega_c t)$ are summed by the adder 139.

The two summation signals are subtracted from one another by the subtractor 140, which outputs a subtraction signal $\cos(\omega_c t+\omega_m t)$ (in this regard cf. addition theorem of trigonometric functions). The power of the subtraction signal cos $(\omega_c t+\omega_m t)$ is regulated by the amplifier 141 and, after filtering by the bandpass filter 142, the analogue modulated signal is sent via the antenna (not shown).

Figure 10B:
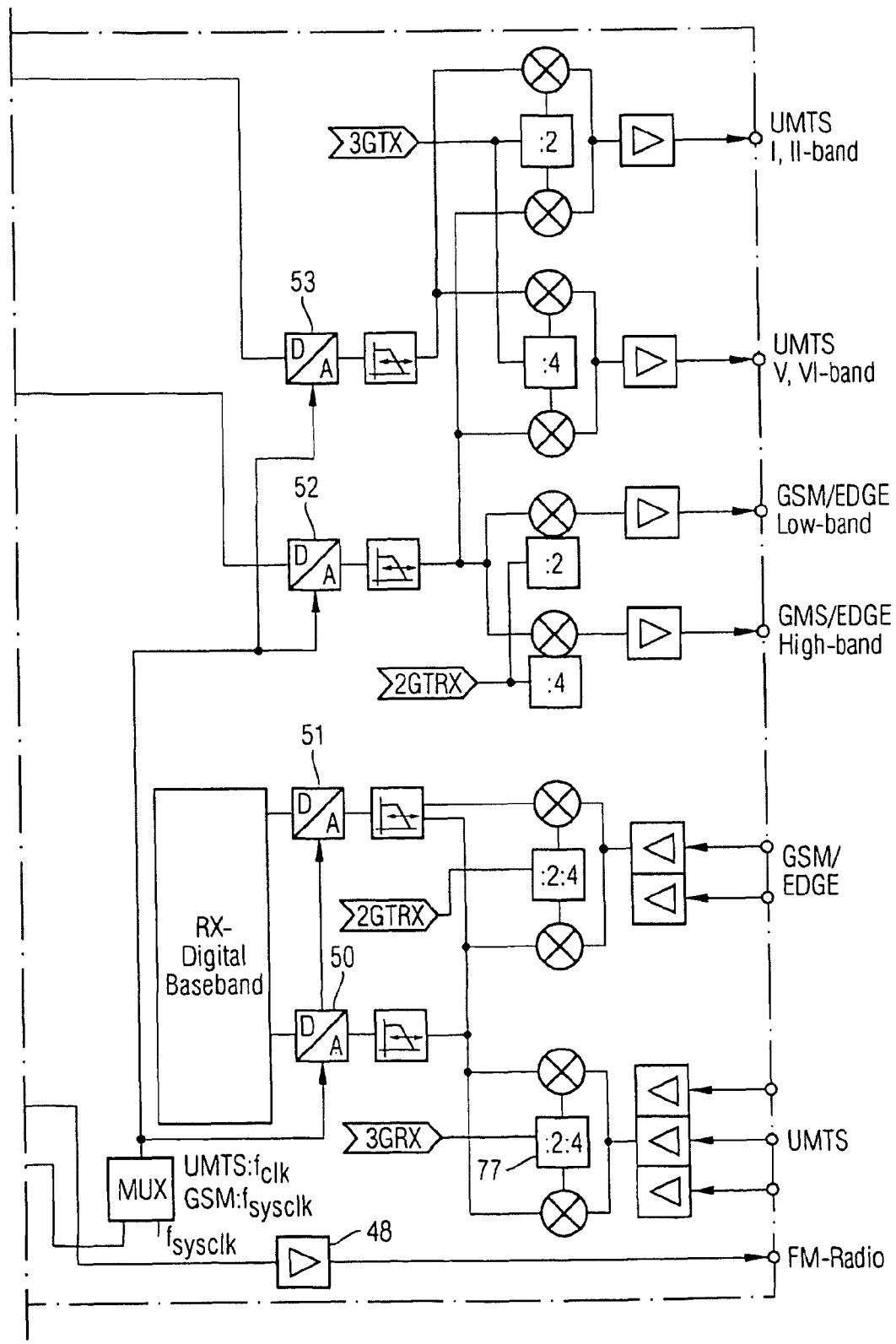
FIG. 10 shows a schematic illustration of an integrated circuit 1000 as an exemplary embodiment.

FIG. 10 shows a schematic illustration of an integrated circuit 1000 as an exemplary embodiment, as it may be integrated in a mobile radio transceiver, for example. In this case components known from the previous figures are identified by the reference signs used therein. The integrated circuit 1000 corresponds largely to the integrated circuit 500 in FIG. 5. For reasons of clarity, not all the components of the integrated circuit 1000 are identified by reference signs, but rather only those which clarify the difference from the integrated circuit 500 in FIG. 5.

In contrast to the integrated circuit 500 in FIG. 5, the PLL frequency synthesizer 2 in the integrated circuit 1000 includes no adder 43 and no sigma-delta modulator 44. Also, the PLL frequency synthesizer 84 additionally has a first multiplexer 145 connected upstream of it and a second multiplexer 146 connected downstream of it. The first input of the multiplexer 145 is coupled to an FIFO memory 40 via an adder 43, while its output is connected to a sigma-delta modulator 85. The output of the PLL frequency synthesizer 84 is coupled to the second multiplexer 146, whose first output corresponds to the output of the PLL frequency synthesizer 84 in FIG. 5, while the second output of the multiplexer 147 is connected to an amplifier 48.

In contrast to FIG. 5, the PLL frequency synthesizer 2 is supplied with no digital audio data to be modulated and with no channel word CHW. As already described within the context of FIG. 5, the PLL frequency synthesizer 2 produces a clock signal for clocking the digital/analogue converters 50, 51, 52, 54. Conversion of digital audio data into analogue, frequency-modulated audio data is not provided by the PLL frequency synthesizer 2.

If the integrated circuit 1000 is intended to produce analogue, frequency-modulated audio data, digital audio data is received on the interface 21 via the data bus 19 and is forwarded to the adder 43. In addition, the adder 43 receives a channel word FM-CHW which stipulates the frequency range of the frequency modulation. For the case of frequency modulation of audio data, the multiplexer 145 forwards the signal which is output by the adder 43 to the PLL frequency synthesizer 84, the frequency modulation being carried out by the PLL frequency synthesizer 84 on the basis of the method described by FIG. 6, for example. The multiplexer 146 forwards the analogue frequency-modulated audio data to the amplifier 48 at a first output.

During mobile radio operation, the PLL frequency synthesizer 84 produces a mixed signal 3GRX in the manner already described in connection with FIG. 5. In this case, the multiplexer 145 forwards the channel word CHW to the PLL frequency synthesizer 84, and the multiplexer 146 forwards the mixed signal 3GRX to the frequency divider 77 for carrier signal production.

In the embodiment in FIG. 10, the PLL frequency synthesizer 84 corresponds in terms of function to the modulator 2 in the further embodiments of the application, since it performs the conversion of the digital audio data. It should be pointed out that in a further possible embodiment, it is possible for the digital audio data to be converted by the PLL frequency synthesizer 88.

Figures 11, 11A:
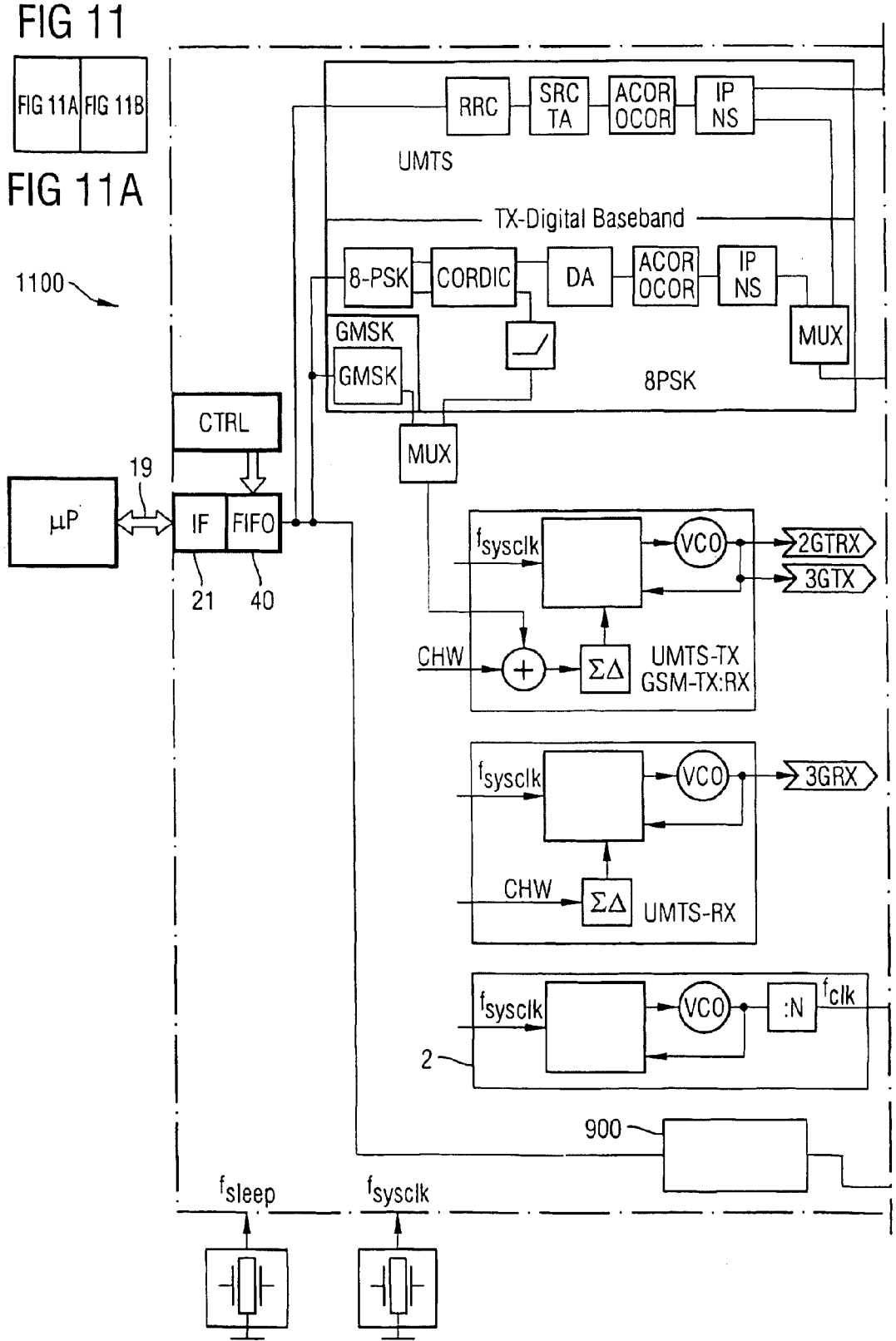
FIG. 11 shows a schematic illustration of an integrated circuit 1100 as an exemplary embodiment.
Figure 11B:
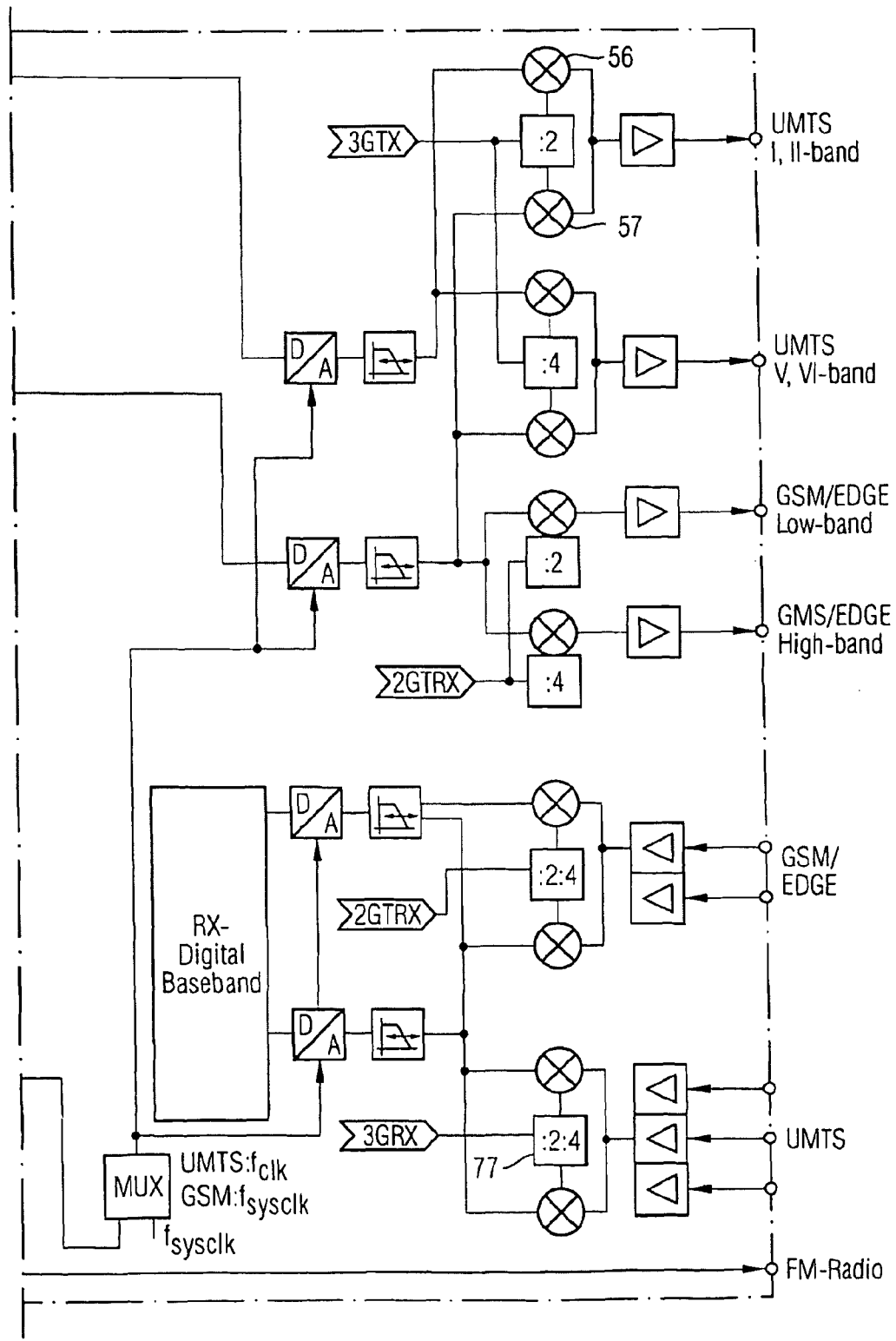

FIG. 11 shows a schematic illustration of an integrated circuit 1100 as an exemplary embodiment, as it may be integrated in a mobile radio transceiver, for example. In this case, components known from previous figures are identified by the reference signs used therein. The integrated circuit 1100 corresponds largely to the integrated circuit 500 in FIG. 5. For reasons of clarity, not all the components of the integrated circuit 1100 are identified by reference signs but rather only those which illustrate the difference from the integrated circuit 500 in FIG. 5.

In contrast to the integrated circuit 500, the PLL frequency synthesizer 2 in the integrated circuit 1100 includes no adder 43 and no sigma-delta modulator 44. Also, the integrated circuit 1100 includes an additional IQ vector modulator 900, as shown in FIG. 9, for example. The input of the IQ vector modulator 900 is coupled to the FIFO memory 40, while its output is coupled to an output of the integrated circuit 1100.

If the integrated circuit 1100 is intended to produce analogue frequency-modulated audio data, digital audio data is received on the interface 21 via the data bus 19 and is forwarded to the IQ vector modulator 900. The IQ vector modulator 900 converts the digital audio data into analogue, frequency-modulated audio data on the basis of the method described in connection with FIG. 9. In this context, it should be pointed out that up-conversion of the analogue frequency-modulated data by the mixers 136, 139 (not shown in FIG. 11) of the IQ vector modulator 900 can also be performed by other mixers in the integrated circuit 1100 (for example the mixers 56, 57) for example. This means that these mixers are used both for mobile radio operation and for the broadcast of audio signals in another frequency range. The analogue frequency-modulated data output by the IQ vector modulator 900 are sent via an antenna (not shown). In this case, too, the PLL frequency synthesizer 2 is not involved in the conversion of the digital audio data into analogue, frequency-modulated audio signals.

Figure 12B:
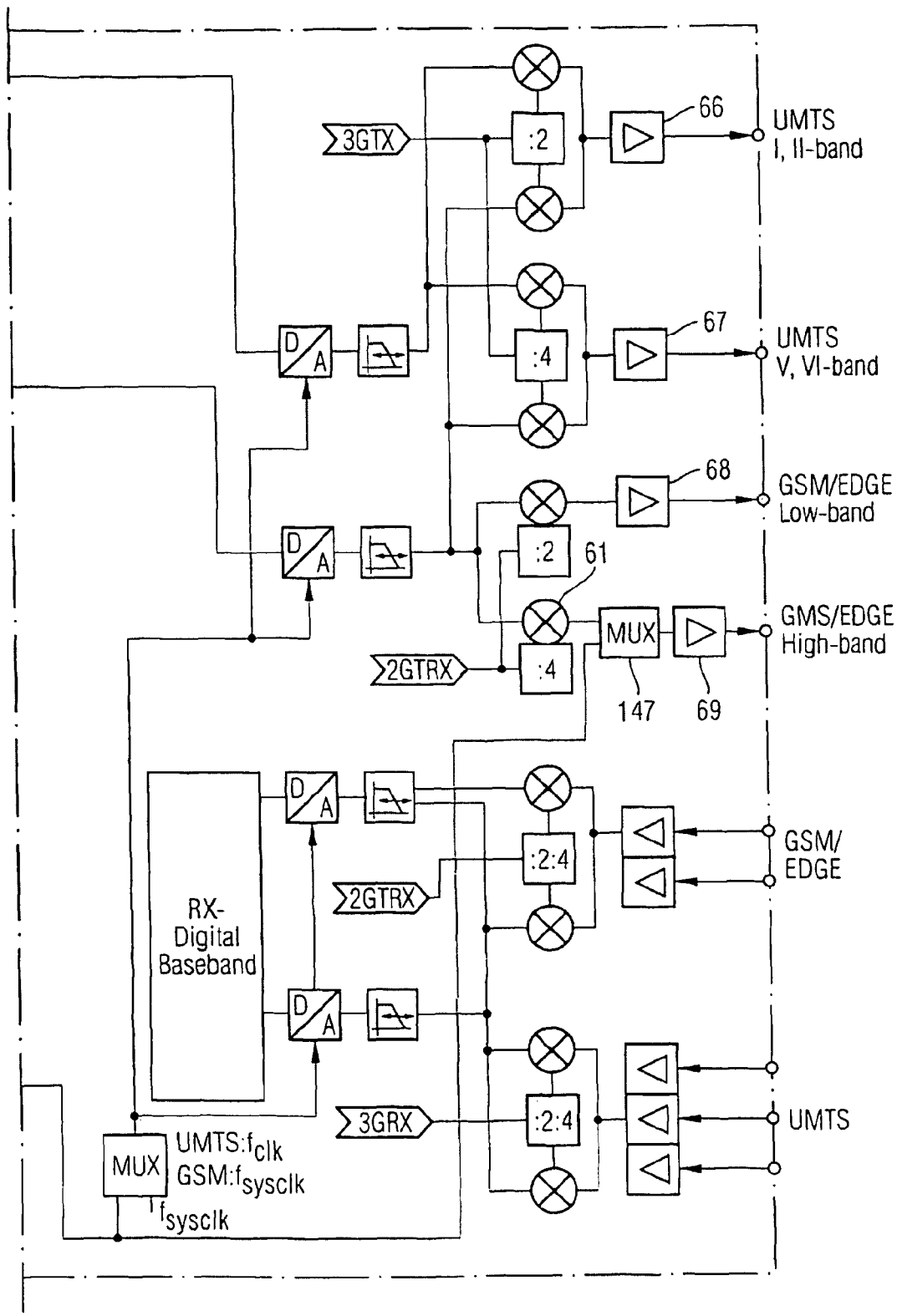
FIG. 12 shows a schematic illustration of an integrated circuit 1200 as an exemplary embodiment.

FIG. 12 shows a schematic illustration of an integrated circuit 1200 as an exemplary embodiment, as it may be integrated in a mobile radio transceiver, for example. In this case, components known from previous figures are identified by the reference signs used therein. The integrated circuit 1200 corresponds largely to the integrated circuit 500 in FIG. 5. For reasons of clarity, not all the components of the integrated circuit 1200 are identified by reference signs but rather only those which clarify the difference from the integrated circuit 500 in FIG. 5.

In contrast to the integrated circuit 500, the integrated circuit 1200 includes no amplifier 45, but rather an additional multiplexer 137. The first input of the multiplexer 137 is coupled to the output of the PLL frequency synthesizer 2, the second input is coupled to the mixer 61 and its output is coupled to an additional amplifier 69.

In contrast to the integrated circuit 500, the power of the analogue frequency-modulated audio data is regulated not by the amplifier 48 but rather by the amplifier 69. If analogue, frequency-modulated data are intended to be produced and sent, the multiplexer 147 forwards these data to the amplifier 69. When mobile radio data are sent on the basis of the GSM/EDGE transmission standard, the multiplexer 147 forwards the mobile radio data to be sent to the amplifier 69. Thus, an amplifier from the radio-frequency assembly which is responsible for transmitting mobile radio signals during mobile radio operation is also used for amplifying the analogue audio signals. It should be pointed out that power regulation of the analogue frequency-modulated audio signals can also be carried out by one of the amplifiers 66, 67, 68, for example instead of by the amplifier 69.

As already mentioned at the outset, the embodiments can be transferred directly to the transmission of non-mobile radio signals with different content as audio signals. In these cases, the memory 6 stores this other transmission data, and this transmission data is processed in the microprocessor 7 in a correspondingly different known manner. Even though frequency modulation of the audio data in the VHF frequency range has been described in conjunction with the transmission of audio signals in the previous exemplary embodiments, neither the frequency modulation nor the indicated broadcast radio frequency bands in which the modulated analogue audio signals are broadcast are imperative. By way of example, the information sent for a "remote keyless entry system" is broadcast in the order of magnitude by several hundred MHz (to be more precise in the range from 315 MHz to 434 MHz (ISM (Industrial, Scientific and Medical) band), for example) and can also be subjected to amplitude modulation instead of frequency modulation.

The invention claimed is:

1. An integrated circuit for a mobile radio transceiver, comprising:
   a radio-frequency assembly configured to produce a radio-frequency mobile radio signal in a mobile radio frequency range; and
   a modulator configured to convert transmission data into an analogue modulated transmission signal in a frequency band outside the mobile radio frequency range, wherein the modulator comprises a PLL frequency synthesizer, and wherein the PLL frequency synthesizer comprises:
   a voltage-controlled oscillator configured to output the analogue modulated transmission signal;
   a phase detector configured to determine a phase difference between a feedback signal, derived from the analogue modulated transmission signal, and a reference signal, and take the determined phase difference as a basis for controlling the voltage-controlled oscillator; and
   a feedback loop configured to provide the feedback signal, wherein the feedback loop comprises a frequency divider that is controlled by the transmission data.

2. The integrated circuit according to claim 1, wherein the modulator comprises a frequency modulator.

3. The integrated circuit according to claim 1, wherein the frequency band comprises the VHF band.

4. The integrated circuit according to claim 1, wherein the frequency band comprises the frequency range from 315 MHz to 434 MHz.

5. The integrated circuit according to claim 1, wherein the PLL frequency synthesizer is configured to clock components of the mobile radio transceiver during mobile radio operation of the mobile radio transceiver.

6. The integrated circuit according to claim 1, wherein the PLL frequency synthesizer is configured to produce phase-modulated mobile radio signals during mobile radio operation of the mobile radio transceiver.

7. The integrated circuit according to claim 1, wherein the transmission data to be converted and a channel word are fed into the PLL frequency synthesizer and a frequency range of the modulation is determined by the channel word.

8. The integrated circuit according to claim 1, wherein the modulator comprises an IQ vector modulator.

9. The integrated circuit according to claim 8, wherein the IQ vector modulator comprises a mixing stage that is configured to operate as a mixing stage for the mobile radio signal during mobile radio operation of the mobile radio transceiver.

10. The integrated circuit according to claim 1, further comprising an amplifier connected between the modulator and the output of the mobile radio transceiver.

11. The integrated circuit according to claim 10, wherein the amplifier is configured to operate as an amplifier for the mobile radio signal during mobile radio operation of the mobile radio transceiver.

12. The integrated circuit according to claim 1, in combination with an antenna configured to transmit the analogue modulated transmission signal of the mobile radio transceiver.

13. The integrated circuit according to claim 12, wherein the antenna comprises a VHF antenna.

14. The integrated circuit according to claim 12, wherein the antenna comprises a mobile radio antenna.

15. The integrated circuit according to claim 1, further comprising a baseband assembly.

16. The integrated circuit according to claim 15, further comprising an interface between the radio-frequency assembly and the baseband assembly that is based on a DigRF standard.

17. The integrated circuit according to claim 1, wherein the transmission data to be converted comprise stereo multiplex signals or information data for a keyless access protection system.

18. The integrated circuit according to claim 1, wherein the mobile radio transceiver is based on the GSM/EDGE standard or the UMTS standard.

19. A method comprising:
producing a radio-frequency mobile radio signal lying in a mobile radio frequency range in an integrated circuit comprising a mobile radio transceiver;
converting transmission data into an analogue modulated transmission signal using a modulator implemented in the integrated circuit, wherein converting the transmission data is performed using the modulator comprises using a PLL frequency synthesizer; and
broadcasting the analogue modulated transmission signal in a frequency band that is outside the mobile radio frequency range,
wherein converting the digital audio data by the PLL frequency synthesizer comprises:
outputting the analogue modulated transmission signal at an output of a voltage-controlled oscillator;
determining a phase difference between a feedback signal, derived from the analogue modulated transmission signal and a reference signal;
controlling the voltage-controlled oscillator based on the determined phase difference;
providing the feedback signal by a feedback loop which comprises a frequency divider; and
controlling the frequency divider by the transmission data.

20. The method according to claim 19, wherein converting the transmission data comprises frequency modulation.

21. The method according to claim 19, wherein the frequency band comprises the VHF band.

22. The method according to claim 19, wherein the frequency band comprises the frequency range from 312 MHz to 433 MHz.

23. The method according to claim 19, wherein the PLL frequency synthesizer produces a clock signal during mobile radio operation.

24. The method according to claim 19, wherein converting the transmission data is performed using an IQ vector modulator.

25. The method according to claim 24, wherein the IQ vector modulator provides the radio-frequency mobile radio signal during mobile radio operation.

26. The method according to claim 19, further comprising:
broadcasting the analogue modulated transmission signal via a VHF antenna or a mobile radio antenna.

27. The method according to claim 19, wherein the transmission data to be converted comprises digital stereo multiplex signals or information data for a keyless access protection system.

28. An integrated circuit for a mobile radio transceiver, comprising:
a radio-frequency assembly configured to produce a radio-frequency mobile radio signal in a mobile radio frequency range; and
a modulator configured to convert transmission data into an analogue modulated transmission signal in a frequency band outside the mobile radio frequency range,
wherein the modulator comprises a PLL frequency synthesizer, and
wherein the PLL frequency synthesizer is configured to clock components of the mobile radio transceiver during mobile radio operation of the mobile radio transceiver.

29. An integrated circuit for a mobile radio transceiver, comprising:
a radio-frequency assembly configured to produce a radio-frequency mobile radio signal in a mobile radio frequency range; and
a modulator configured to convert transmission data into an analogue modulated transmission signal in a frequency band outside the mobile radio frequency range,
wherein the modulator comprises a PLL frequency synthesizer, and
wherein the PLL frequency synthesizer is configured to produce phase-modulated mobile radio signals during mobile radio operation of the mobile radio transceiver.

30. An integrated circuit for a mobile radio transceiver, comprising:
a radio-frequency assembly configured to produce a radio-frequency mobile radio signal in a mobile radio frequency range; and
a modulator configured to convert transmission data into an analogue modulated transmission signal in a frequency band outside the mobile radio frequency range,
wherein the modulator comprises an IQ vector modulator, and
wherein the IQ vector modulator comprises a mixing stage that is configured to operate as a mixing stage for the mobile radio signal during mobile radio operation of the mobile radio transceiver.

* * * * *